(12) United States Patent
Hin et al.

(10) Patent No.: US 12,311,371 B2
(45) Date of Patent: May 27, 2025

(54) APPARATUS AND METHOD FOR TRANSPORTING MAGNETIC PARTICLES

(71) Applicant: Hahn-Schickard-Gesellschaft für angewandte Forschung e.V., Villingen-Schwenningen (DE)

(72) Inventors: Sebastian Hin, Freiburg (DE); Konstantinos Mitsakakis, Freiburg (DE); Markus Rombach, Freiburg (DE); Nils Paust, Freiburg im Breisgau (DE)

(73) Assignee: Hahn-Schickard-Gesellschaft für angewandte Forschung e.V., Villingen-Schwenningen (DE)

( * ) Notice: Subject to any disclaimer, the term of this patent is extended or adjusted under 35 U.S.C. 154(b) by 999 days.

(21) Appl. No.: 17/313,484

(22) Filed: May 6, 2021

(65) Prior Publication Data

US 2021/0252515 A1  Aug. 19, 2021

Related U.S. Application Data

(63) Continuation of application No. PCT/EP2019/080517, filed on Nov. 7, 2019.

(30) Foreign Application Priority Data

Nov. 8, 2018 (DE) ..................... 10 2018 219 091.7

(51) Int. Cl.
*B01L 3/00* (2006.01)
*B03C 1/01* (2006.01)
*B03C 1/28* (2006.01)

(52) U.S. Cl.
CPC ........ *B01L 3/502761* (2013.01); *B03C 1/288* (2013.01); *B01L 2200/0668* (2013.01);
(Continued)

(58) Field of Classification Search
CPC ....... B01L 3/502761; B01L 2200/0668; B01L 2400/0409; B01L 2400/043; B03C 1/288; B03C 1/01; B03C 2201/18; B03C 2201/26
See application file for complete search history.

(56) References Cited

U.S. PATENT DOCUMENTS

2008/0007354 A1  1/2008  Ahsan et al.
2012/0295366 A1  11/2012  Sonya et al.
(Continued)

FOREIGN PATENT DOCUMENTS

CN  103384565 A  11/2013
CN  104312114 A  1/2015
(Continued)

OTHER PUBLICATIONS

Espacenet English Translation of JP2009148735A. (Year: 2009).*
(Continued)

*Primary Examiner* — Kathryn Elizabeth Limbaugh
(74) *Attorney, Agent, or Firm* — Bridgeway IP Law Group, PLLC; Jihun Kim

(57) ABSTRACT

An apparatus for transporting magnetic particles. The apparatus can comprise a substrate that can be configured for rotating around an axis of rotation. Further, fluidic structures can be arranged in the substrate, which can comprise an oblique chamber wall that can be arranged at an angle α with respect to a plane perpendicular to the axis of rotation. A magnetic force element can be arranged radially inside the oblique chamber wall with respect to the axis of rotation and can be configured to apply a magnetic force to the magnetic particles disposed in the fluidic structures depending on a positional relationship between the magnetic force element and the fluidic structures, wherein the oblique chamber wall is inclined towards the magnetic force element.

2 Claims, 14 Drawing Sheets

(52) U.S. Cl.
CPC . *B01L 2400/0409* (2013.01); *B01L 2400/043* (2013.01); *B03C 1/01* (2013.01); *B03C 2201/18* (2013.01); *B03C 2201/26* (2013.01)

(56) References Cited

U.S. PATENT DOCUMENTS

| | | |
|---|---|---|
| 2013/0206701 A1 | 8/2013 | Strohmeier et al. |
| 2014/0341788 A1 | 11/2014 | Kim et al. |
| 2016/0209409 A1 | 7/2016 | Choi |
| 2018/0003704 A1 | 1/2018 | Takao et al. |
| 2018/0059102 A1 | 3/2018 | Horii et al. |

FOREIGN PATENT DOCUMENTS

| | | |
|---|---|---|
| DE | 102010041621 A1 | 3/2012 |
| EP | 2621632 A1 | 8/2013 |
| EP | 3088891 A1 | 11/2016 |
| EP | 3396385 A1 | 10/2018 |
| JP | H02264197 A | 10/1990 |
| JP | 2009-148735 A | 7/2009 |
| KR | 20060118695 A | 11/2006 |
| WO | 2012041809 A1 | 4/2012 |

OTHER PUBLICATIONS

O. Strohmeier et al., "Centrifugal gas-phase transition magnetophoresis (GTM)—a generic method for automation of magnetic bead based assays on the centrifugal microfluidic platform and application to DNA purification", Lab on a chip 13, 2013, pp. 146-155.

M. Grumann et al, "Batch-mode mixing on centrifugal microfluidic platforms", Lab on a chip 5, 2005, pp. 560-565.

Haiqi Gao, "Office Action for CN Application No. 201980088438. 0", Mar. 16, 2022, CNIPA, China.

* cited by examiner

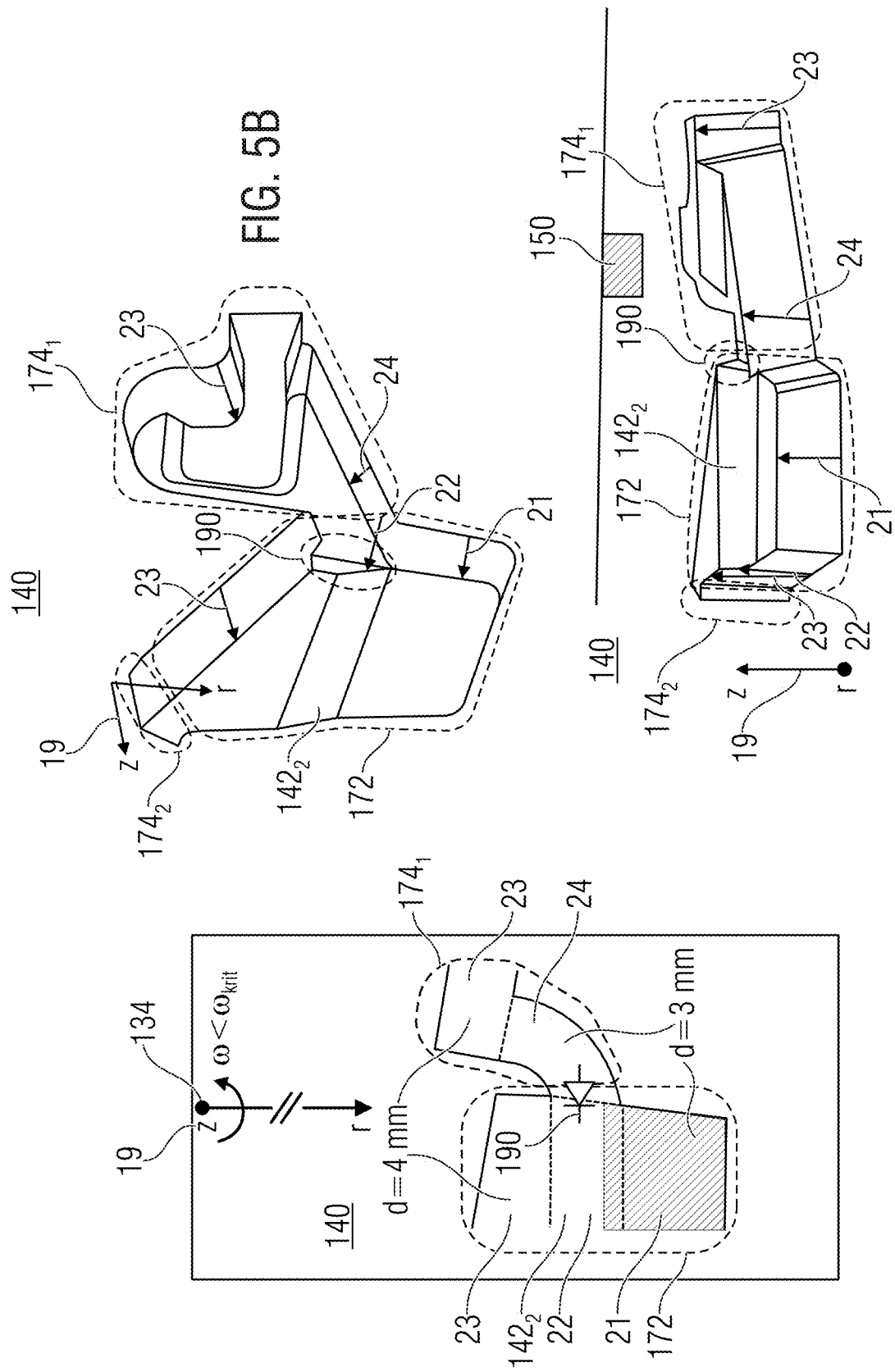

APPARATUS AND METHOD FOR TRANSPORTING MAGNETIC PARTICLES

CROSS-REFERENCE TO RELATED APPLICATIONS

This application is a continuation of copending International Application No. PCT/EP2019/080517, filed Nov. 7, 2019, which is incorporated herein by reference in its entirety, and additionally claims priority from German Application No. 10 2018 219 091.7, filed Nov. 8, 2018, which is also incorporated herein by reference in its entirety.

Embodiments according to the invention relate to an apparatus and a method for transporting magnetic particles.

BACKGROUND OF THE INVENTION

In the following, three existing approaches of the field of centrifugal microfluidics will be presented, which allow automated manipulation of magnetic particles in a rotating system.

Strohmeier et al. have patented [1] and published [2] a method called "gas-phase transition magnetophoresis" (GTM). In this method for transporting magnetic particles, a centrifugal microfluidic cartridge (called "lab disk") is located below a stationary permanent magnet. Here, however, a magnetic force acting on particles during GTM cannot be adjusted in a quantifiable manner, since liquids are present in an uncontrolled state during standstill (regarding the formation of the interface between liquid and gas). Further, the method is not universally applicable (i.e., for liquids of any wetting characteristics). Highly wetting liquids (e.g., alcohols or surfactants that are frequently used in nucleic acid extraction) can creep along the edges of the microfluidic network during the necessary phases of standstill (Concus-Finn condition). Consequently, undesired mixing of different liquids can result which can affect the quality of the analysis to be performed. Additionally, the method uses only a fraction of the theoretically usable magnetic force, since the main component of the magnetic force vector ($F_{mag}$) in the described configuration acts orthogonally to the wall of the cartridge facing the permanent magnet ($F_s$) and not in the direction of transport of the particles ($F_r$), which is why a transport of the particles cannot be performed very efficiently with the method.

In the past, different further groups have used magnetic particles for mixing liquids in centrifugal microfluidic test carriers. Grumann et al. [3] have published a method that is described in a comparative manner in a patent request by Andersson et al. [4]. In the above stated publications, similar to the GTM method [2], permanent magnets are arranged above or below the centrifugal microfluidic cartridge, such that the particles in the cartridge pass through the magnetic field of the permanent magnet with each rotation by rotating the same, which results in a mixing of the liquids due to a magnetically induced particle movement. However, these described papers merely allow the control of particle movements within a microfluidic chamber and not the transport between different chambers.

In the above stated automation of laboratory processes in centrifugal microfluidic cartridges, the challenge of specifically manipulating the movement of the magnetic particles to implement the desired operations arises. In centrifugal microfluidics, in particular the following problems are insufficiently solved:

Currently, there is no method allowing quantitative prognosis on the forces acting on the particles at the time of transferring the particles out of a liquid.

Existing methods allow either mixing or transferring or holding back particles but not all these unit operations simultaneously.

Existing methods allow no control of the force acting on the magnetic particles based on the chamber geometry (passive, monolithic).

Existing methods allow no controllable state of the liquids during the transfer of particles from one chamber into another chamber.

Existing methods are not suitable for handling highly wetting liquids (such as alcohols, surfactants) which are, however, frequently used in the above stated fields of application.

SUMMARY

According to an embodiment, an apparatus for transporting magnetic particles may have: a substrate configured for rotation around an axis of rotation; fluidic structures including recesses in the substrate including an oblique chamber wall arranged at an angle α, 0°<α<90°, with respect to a plane perpendicular to the axis of rotation, and wherein the recesses in the substrate are closed by a sealing structure by arranging the sealing structure on a sealing area of the substrate where the recesses are arranged; a magnetic force element arranged radially inside the oblique chamber wall with respect to the axis of rotation and configured to apply a magnetic force to the magnetic particles disposed in the fluidic structures depending on a positional relationship between the magnetic force element and the fluidic structures, wherein the oblique chamber wall is inclined towards the magnetic force element and wherein the magnetic force element is mounted on a stationary carrier arranged on a side of the substrate opposite to the sealing area; and a drive configured to provide the substrate with a rotation around the axis of rotation, whereby the positional relationship between the magnetic force element and the fluidic structures changes continuously and to thereby apply a force to the magnetic particles during a rotation by an angle of 360° around the axis of rotation to transport the magnetic particles along the oblique chamber wall and radially inwards with respect to the axis of rotation.

According to another embodiment, a method for transporting magnetic particles may have the steps of: rotating a substrate around an axis of rotation by means of a drive, wherein a positional relationship between a magnetic force element and fluidic structures in the substrate is continuously changed; applying a magnetic force to the magnetic particles disposed in the fluidic structures by means of the magnetic force element depending on the positional relationship between the magnetic force element and the fluidic structures in the substrate, wherein the fluidic structures in the substrate include recesses including an oblique chamber wall arranged at an angle α, 0°<α<90°, with respect to a plane perpendicular to the axis of rotation, wherein the oblique chamber wall is inclined towards the magnetic force element and wherein the magnetic force element is arranged radially inside the oblique chamber wall with respect to the axis of rotation and is mounted on a stationary carrier arranged on a side of the substrate opposite to the sealing area, and wherein the recesses in the substrate are closed by a sealing structure by arranging the sealing structure on a sealing area of the substrate where the recesses are arranged; and transporting the magnetic particles disposed in the fluidic structures along the oblique chamber wall radially inwards with respect to the axis of rotation by means of a force applied to the magnetic particles during a 360° rotation.

According to another embodiment, an apparatus for transporting magnetic particles may have: a substrate configured for rotation around an axis of rotation; fluidic structures in the substrate, wherein the fluidic structures include a first fluid chamber, a second fluid chamber and a connection connecting the first fluid chamber to the second fluid chamber; a magnetic force element configured to apply a magnetic force to the magnetic particles disposed in the fluidic structures, depending on a positional relationship between the magnetic force element and the fluidic structures; and a drive configured to provide the substrate with a rotation around the axis of rotation, whereby the positional relationship between the magnetic force element and the fluidic structures changes continuously, and to apply a force to the magnetic particles during a rotation at an angle of 360° around the axis of rotation to transport the magnetic particles via the connection from the first fluid chamber into the second fluid chamber; wherein the connection includes an inner wall including a lower radial position than an outer wall with respect to the axis of rotation and whose radial position changes in azimuthal direction towards the second fluid chamber to change a position of the magnetic particles during transport through the connection both in azimuthal direction from the first fluid chamber in the direction of the second fluid chamber as well as in a direction radially inwards with respect to the axis of rotation when the substrate is provided with a rotational frequency lower than a critical rotational frequency; wherein the radial position of the inner wall changes in azimuthal direction radially inwards up to a turning point and the radial position changes radially outwards from the turning point, wherein the inner wall is configured to stop the magnetic particles at this turning point due to the magnetic force when the substrate is provided with the rotational frequency lower than the critical rotational frequency; and wherein the inner wall is configured after the turning point such that, when providing the substrate with a rotational frequency greater than the critical rotational frequency, the same changes the position of the magnetic particles both in azimuthal direction, in the direction of the second fluid chamber, as well as in a direction radially outwards with respect to the axis of rotation to transport the magnetic particles into the second fluid chamber.

According to another embodiment, a method for transporting magnetic particles may have the steps of: rotating a substrate around an axis of rotation by means of a drive, wherein a positional relationship between a magnetic force element and fluidic structures in the substrate is continuously changed; applying a magnetic force to the magnetic particles disposed in the fluidic structures by means of the magnetic force element depending on the positional relationship between the magnetic force element and the fluidic structures in the substrate, wherein the fluidic structures in the substrate include an oblique chamber wall arranged at an angle α with respect to a plane perpendicular to the axis of rotation, wherein the oblique chamber wall is inclined towards the magnetic force element and wherein the magnetic force element is arranged radially inside the oblique chamber wall with respect to the axis of rotation; and transporting the magnetic particles disposed in the fluidic structures along the oblique chamber wall radially inwards with respect to the axis of rotation by means of a force applied to the magnetic particles during a 360° rotation; wherein a rotational frequency is varied during rotation such that, when applying the magnetic force in a first phase, the rotational frequency falls below a critical rotational frequency, whereby the magnetic particles are transported by the magnetic force along the oblique chamber wall in a direction radially inwards with respect to the axis of rotation out of a first fluid chamber and parallel to an inner wall of a connection to a turning point of the connection between the first fluid chamber and a second fluid chamber, and in a second phase, the rotational frequency exceeds the critical rotational frequency, whereby the magnetic particles are transported centrifugally in a direction radially outwards with respect to the axis of rotation from the connection into the second fluid chamber; wherein at least one of the two fluid chambers is at least partly filled with a liquid medium and wherein the magnetic particles are moved across a phase boundary between the liquid medium and a gaseous medium during transport; and wherein the magnetic particles are transported to a fluid chamber without liquid medium and are dried in the fluid chamber without liquid medium.

According to another embodiment, a method for transporting magnetic particles may have the steps of: rotating a substrate around an axis of rotation by means of a drive, wherein a positional relationship between a magnetic force element and fluidic structures in the substrate is continuously changed; applying a magnetic force to the magnetic particles disposed in the fluidic structures by means of the magnetic force element depending on the positional relationship between the magnetic force element and the fluidic structures in the substrate, wherein the fluidic structures in the substrate include an oblique chamber wall arranged at an angle α with respect to a plane perpendicular to the axis of rotation, wherein the oblique chamber wall is inclined towards the magnetic force element and wherein the magnetic force element is arranged radially inside the oblique chamber wall with respect to the axis of rotation; and transporting the magnetic particles disposed in the fluidic structures along the oblique chamber wall radially inwards with respect to the axis of rotation by means of a force applied to the magnetic particles during a 360° rotation; wherein a rotational frequency is varied during rotation such that, when applying the magnetic force in a first phase, the rotational frequency falls below a critical rotational frequency, whereby the magnetic particles are transported by the magnetic force along the oblique chamber wall in a direction radially inwards with respect to the axis of rotation out of a first fluid chamber and parallel to an inner wall of a connection to a turning point of the connection between the first fluid chamber and a second fluid chamber, and in a second phase, the rotational frequency exceeds the critical rotational frequency, whereby the magnetic particles are transported centrifugally in a direction radially outwards with respect to the axis of rotation from the connection into the second fluid chamber; wherein at least one of the two fluid chambers is at least partly filled with a liquid medium and wherein the magnetic particles are moved across a phase boundary between the liquid medium and a gaseous medium during transport; and wherein both fluid chambers are partly filled with liquid medium such that, during transport, the magnetic particles are transported from a first liquid medium via gaseous medium into a second liquid medium; and wherein the magnetic particles are dried in the gaseous medium.

An embodiment relates to an apparatus for transporting magnetic particles. Magnetic particles can, for example, be solids typically having a size of 1 pm to 5 mm, 500 pm to 2 mm or 1 nm to 1 mm. Here, a magnetic core material can be provided which can be para-, ferro-, or ferri-magnetic. An (application-specific) cladding of the core with a different material, e.g., silicon dioxide or polymer, is possible. The cladding of the core can again be clad by a magnetic material, which can again be clad by another material. Thus, the magnetic particles can have at least two layers. The surface of the particle can be occupied with different molecules, which can form chemical bonds with analytes, e.g., silanol groups (SiOH), silica groups ($SiO_2$), carboxyl groups (COOH), etc., or proteins, antibodies or oligo-nucleotides, etc. The list of materials stated herein which can comprise the magnetic particles are to be considered as exemplary and not limiting.

The apparatus can comprise a substrate that can be configured for rotation around an axis of rotation and fluidic structures in the substrate comprising an oblique chamber wall that can be arranged at an angle α with respect to a plane perpendicular to the axis of rotation. The substrate can comprise, for example, a disc having a thickness perpendicular to a circular area in a range of 1 nm to 5 cm, 10 nm to 1 cm or 100 nm to 5 mm and can have a diameter of the circular areas in a range of 2 cm to 30 cm, 3 cm to 20 cm or 5 cm to 10 cm. Here, the circular areas are arranged, e.g., perpendicular to the axis of rotation. The substrate comprises, e.g., a material on polymer basis, such as thermoplastics, thermosetting plastics or elastomers or glass, such as silicon dioxide. The axis of rotation can lead, for example, through a center of the circular areas of the substrate and the plane perpendicular to the axis of rotation can represent one of the two circular areas of the substrate.

Further, the apparatus can comprise a magnetic force element arranged radially inside the oblique chamber with respect to the axis of rotation and configured to apply a magnetic force to the magnetic particles disposed in the fluidic structures depending on a positional relationship between the magnetic force element and the fluidic structures, wherein the oblique chamber wall is inclined towards the magnetic force element. Optionally, the apparatus can comprise several magnetic force elements. The one or the several magnetic force elements can comprise a permanent magnet (e.g., ferromagnet, rare earth magnet, etc.), an electromagnet or partly a permanent magnet and partly an electromagnet. The oblique chamber wall can have a position radially distant from the axis of rotation in the substrate, such that radially inside the oblique chamber wall can mean that the magnetic force element can be arranged in an area from the axis of rotation up to the position of the oblique chamber wall. Thus, the magnetic force element is arranged, e.g., radially further inside with respect to the oblique chamber wall.

Further, the apparatus can comprise a drive configured to provide the substrate with a rotation around the axis of rotation, whereby the positional relationship between the magnetic force element and the fluidic structures changes continuously and to thereby apply a force to the magnetic particles during a rotation at an angle of 360° around the axis of rotation to transport the magnetic particles along the oblique chamber wall and radially inside with respect to the axis of rotation.

The embodiment of the apparatus is based on the finding that a portion of the magnetic force that can be used for transporting the magnetic particles can be increased by the oblique chamber wall inclined at an angle α towards the magnetic force element, compared to a chamber wall that is not inclined, whereby the magnetic particles can be transported fast and efficiently within the fluidic structures in the substrate. Thus, the oblique chamber wall can allow simplified transport of the magnetic particles in fluidic structures since less frictional forces act on the magnetic particles through the surface of the oblique chamber wall compared to a wall parallel to the perpendicular plane and hence a larger portion of the magnetic force can be used for transporting the particles. The hence very efficient transport of the magnetic particles can take place during continuous rotation of the substrate, whereby, during transporting the magnetic particles, a state of a liquid in the fluidic structures (optionally, the magnetic particles are disposed in the liquid) can be controlled very well by the apparatus, since, e.g., a defined location of a phase transition (e.g., from the liquid to a gas in the fluidic structures) can be defined by the continuous rotation. Thus, the continuous rotation additionally allows mixing of liquids within the fluidic structures to be prevented since a position of the liquids within the fluidic structures can be determined by the continuous rotation and the position can be held.

Thus, it has to be stated that the apparatus can allow efficient transport of the magnetic particles due to the oblique chamber wall and the continuous rotation of the substrate, with complete state control of the liquid and prevention of mixing of liquids within the fluidic structures.

According to an embodiment, the oblique chamber wall can have the angle α in a range of 0° to 90°, wherein the limits of α=0° and α=90° are excluded (0°<α<90°). Thus, the angle α of the oblique chamber wall can be adapted such that the magnetic force applied to the magnetic particles is very large such that the magnetic force is not eliminated by frictional forces of the surface of the oblique chamber wall, which allows efficient transport of the magnetic particles through the apparatus. Alternatively, the angle α can be in a range of 5° to 85°, 10° to 80°, or 25° to 65°.

According to an embodiment, the fluidic structures in the substrate can comprise recesses comprising the oblique chamber wall. Further, the fluidic structures can comprise a sealing structure that can be arranged on a sealing area of the substrate where the recesses are arranged. Thus, for example, the oblique chamber wall can be arranged in the substrate and the recesses in the substrate can be closed by the sealing structure. Here, the sealing structure can be opposite to the oblique chamber wall. Optionally, the fluidic structures can have a connection to the outside through the substrate or through the sealing structure. The sealing structure is, e.g., a disc that can have the same dimensions as the substrate or deviating dimensions such as, e.g., a lower or greater thickness or a lower or greater diameter. As the sealing structure is, for example, firmly connected to the substrate via the sealing area, the drive of the apparatus can provide both the substrate as well as the sealing structure with the continuous rotation around the axis of rotation.

According to an embodiment, the magnetic force elements can be mounted on a stationary carrier arranged on a side of the substrate opposite to the sealing area. Thus, the magnetic force element can be arranged on sides of the oblique chamber wall of the fluidic structure in the substrate and opposite to the sealing structure (the substrate is, for example, located between the magnetic force element and the sealing structure). Because the magnetic force element is mounted on the stationary carrier, the positional relationship between the magnetic force element and the fluidic structures can change due to the continuous rotation of the substrate. Thus, the magnetic force element can apply a magnetic force to the magnetic particles to transport the magnetic particles from one position in the substrate to another position in the substrate during the rotation. Optionally, the apparatus comprises several magnetic force elements that can be arranged at different positions on the stationary carrier. Thus, the transport of the magnetic particles can be configured very efficiently as, for example, magnetic particles at different positions within the fluidic structures can change their position simultaneously by means of the magnetic force and/or the portion of the magnetic force acting in the direction of transport is increased, which makes the transport very fast and effective.

According to an embodiment, the fluidic structures can comprise a first fluid chamber, a second fluid chamber and a connection connecting the first fluid chamber to the second fluid chamber. Further, at least one of the fluid chambers can comprise the oblique chamber wall. Thus, for example, the first fluid chamber or the second fluid chamber can comprise the oblique chamber wall by means of which the magnetic particles can be transported along the oblique chamber wall to the connection by the magnetic force. Thus, the oblique chamber wall can be inclined towards the magnetic force element and towards the connection to guide the magnetic particles very efficiently in the direction of the connection.

According to an embodiment, the apparatus can be configured to transport the magnetic particles from the first fluid chamber into the second fluid chamber via the connection. Thus, for example, the first fluid chamber comprises the oblique chamber wall, whereby the magnetic particles can be transported along the oblique chamber wall to the connection during the continuous rotation and subsequently to the second fluid chamber via the connection. Here, the connection can be arranged radially further inside than the oblique chamber wall with respect to the axis of rotation, wherein the magnetic force element is arranged with respect to a position of the connection such that the magnetic force applied by the magnetic force element to the magnetic particles effects a transport of the magnetic particles via the connection from the first fluid chamber into the second fluid chamber. Thus, the magnetic force element can be arranged, e.g., radially further inside than the connection or at a minimum radial position of the connection. Here, the minimum radial position of the connection comprises, e.g., a smallest distance to the axis of rotation compared to further radial positions along the connection.

According to an embodiment, the connection can comprise an inner wall comprising a lower radial position than an outer wall with respect to the axis of rotation and whose radial position changes in azimuthal direction towards the second fluid chamber to change a position of the magnetic particles during transport through the connection both in azimuthal direction from the first fluid chamber in direction of the second fluid chamber as well as in a direction radially inwards with respect to the axis of rotation when the substrate is provided with a rotational frequency lower than a critical rotational frequency. Thus, the position of the inner wall can change both in azimuthal direction, i.e., in a direction of a unit vector of the rotation around the axis of rotation as well as radially inwards with respect to the axis of rotation along the azimuthal direction. Thus, the inner wall of the connection can comprise, for example from the first fluid chamber to the second fluid chamber, a reduction of a distance to the axis of rotation (a change radially inwards).

The rotation of the substrate around the axis of rotation can comprise the rotational frequency. If the rotational frequency is lower than the critical rotational frequency, the magnetic force that can be applied by the magnetic force element to the magnetic particles, e.g., greater than a rotation-induced centrifugal force that can be applied to the particles, whereby the magnetic particles inside the first fluid chamber can be transported along the oblique chamber wall radially inwards to the connection and can be transported inside the connection in azimuthal direction from the first fluid chamber to the second fluid chamber with a further radial change of position radially inwards (for example along the inner wall of the connection). Thus, during a transport radially inwards, the magnetic particles can impinge on the inner wall whose radial position changes in azimuthal direction, such that the magnetic particles, on their further way radially inwards, are also moved in azimuthal direction on the substrate (e.g., inside the fluidic structures) in the direction from the first fluid chamber, where the magnetic particles come from, to the second fluid chamber.

According to an embodiment, the radial position of the inner wall can change in azimuthal direction radially inwards up to a turning point and the radial position can change radially outwards from the turning point, wherein the inner wall can be configured to stop the magnetic particles at this turning point due to the magnetic force when the substrate is provided with the rotational frequency lower than the critical rotational frequency. Thus, the inner wall of the connection can comprise a first section from the first fluid chamber to the turning point where a distance from the inner wall to the axis of rotation can continuously decrease and can have a second section, e.g., from the turning point to the second fluid chamber, where a distance from the inner wall to the axis of rotation can continuously increase. Thus, the radial position of the inner wall changes along the azimuthal direction, for example first radially inwards and after the turning point radially outwards.

As already explained above, at a rotational frequency lower than the critical rotational frequency, the magnetic force acting radially inwards can be greater than the rotation-induced centrifugal force acting radially outwards. Thus, the magnetic particles can be stopped in an area around the turning point, since the magnetic particles are pulled radially inwards at the rotational frequency lower than the critical rotational frequency but the connection at the turning point changes radially outwards. In other words, the change of the radial position of the inner wall (e.g., in azimuthal direction along the inner wall) can have a sign. The change of the radial positon of the inner wall can change the sign at a position (e.g., at the turning point) on a radial axis towards the second fluid chamber, such that the magnetic particles are stopped at this turning point by the magnetic force acting radially inwards. Here, the magnetic particles can be stopped, for example in an area around this turning point, wherein the magnetic particles are stopped, for example, by a part of the inner wall running radially outwards.

According to an embodiment, the inner wall can be configured after the turning point such that, when providing the substrate with a rotational frequency greater than the critical rotational frequency, the same changes the position of the magnetic particles both in azimuthal direction, in the direction of the second fluid chamber, as well as in a direction radially outwards with respect to the axis of rotation to transport the magnetic particles into the second fluid chamber. If the rotation-induced rotational frequency of the substrate is greater than the critical rotational frequency, the magnetic force that can act on the magnetic particles can be lower than the rotation-induced centrifugal force acting on the particles, whereby the magnetic particles can be transported radially outwards, i.e., away from the axis of rotation (the distance to the axis of rotation becomes greater, for example). Thus, the magnetic particles can be transported from the turning point into the second fluid chamber.

Here, it should be noted that the rotational frequency of the substrate can change during the transport of the magnetic particles but the substrate can be continuously provided with a rotation comprising the rotational frequency. In other words, the change of the radial position of the inner wall can comprise a sign. After a change of the sign, the inner wall can be oriented such that when providing the critical rotational frequency that has the effect that the magnetic force acting radially inwards on the magnetic particles can be overcome by the centrifugal force and the magnetic particles can be transported radially outwards, the magnetic particles can gather in the second fluid chamber.

Thus, the magnetic particles can be transported through the connection from the first fluid chamber into the second fluid chamber by using different rotational frequencies by which the substrate is provided. Here, the transport of the magnetic particles can run along the inner wall of the connection of the fluidic structures and can be controlled by the drive by means of rotation.

According to an embodiment, the connection can lead into the second fluid chamber such that a step is formed at the orifice, which prevents transport of the magnetic particles from the second fluid chamber into the connection of the first fluid chamber when a magnetic force acts. The step can be formed, for example, such that the same points away from the magnetic force element whereby the magnetic particles attracted by the magnetic force of the magnetic force element are moved opposite to the direction of the step whereby the magnetic particles cannot overcome the step. Here, the direction of the step is defined, e.g., as a change of the chamber wall of the second fluid chamber away from the magnetic force element running parallel to the axis of rotation (or with an inclination of up to 45° from the second fluid chamber in the direction of the first fluid chamber with respect to the axis of rotation). Thereby, direction-dependent transport, i.e., from the first fluid chamber into the second fluid chamber, can be effected, since the step can prevent that the magnetic particles are transported from the second fluid chamber through the connection into the first fluid chamber. With this feature, very efficient transport of the magnetic particles from the first fluid chamber into the second fluid chamber can be effected, while preventing mixing of liquids or magnetic particles from the second fluid chamber with liquids or magnetic particles from the first fluid chamber as return transport is prevented.

An embodiment provides a method for transporting magnetic particles comprising the step of rotating a substrate around an axis of rotation by means of a drive, wherein a positional relationship between a magnetic force element and fluidic structures in the substrate is continuously changed.

A magnetic force can be applied to magnetic particles disposed in the fluidic structures by means of a magnetic force element depending on a positional relationship between the magnetic force element and fluidic structures in the substrate, wherein the fluidic structures in the substrate comprise an oblique chamber wall arranged at an angle α with respect to a plane perpendicular to the axis of rotation, wherein the oblique chamber wall is inclined towards the magnetic force element and wherein the magnetic force element is arranged radially inside the oblique chamber wall with respect to the axis of rotation. Further, the method can comprise transporting the magnetic particles disposed in the fluidic structures along the oblique chamber wall radially inwards with respect to the axis of rotation by means of a force applied to the particles during a 360° rotation.

According to an embodiment, a rotational frequency can be varied during rotation such that, when applying the magnetic force in a first phase, the rotational frequency falls below a critical rotational frequency, whereby the magnetic particles are transported by the magnetic force along the oblique chamber wall in a direction radially inwards with respect to the axis of rotation out of a first fluid chamber and parallel to an inner wall of a connection to a turning point of the connection between the first fluid chamber and a second fluid chamber, and in a second phase, the rotational frequency exceeds the critical rotational frequency, whereby the magnetic particles are transported centrifugally in a direction radially outwards with respect to the axis of rotation from the connection into the second fluid chamber.

According to an embodiment, at least one of the two fluid chambers can be at least partly filled with a liquid medium and the magnetic particles can be moved across a phase boundary (e.g., meniscus=interface between liquid and gas in a fluidic structure) between the liquid medium and a gaseous medium during transport.

According to an embodiment, the magnetic particles can be transported to a fluid chamber without liquid medium and can be dried in the fluid chamber without liquid medium.

According to an embodiment, both fluid chambers can be partly filled with liquid medium, such that, during transport, the magnetic particles can be transported from a first liquid medium via gaseous medium into a second liquid medium. According to an embodiment, the magnetic particles can be dried in the gaseous medium.

According to an embodiment, the first fluid chamber can be filled with the liquid medium such that the phase boundary is arranged on the oblique chamber wall.

According to an embodiment, the second fluid chamber can be partly filled with liquid medium and the first fluid chamber can be completely filled with gaseous medium. Further, the first fluid chamber can comprise the magnetic particles such that, during transport, the magnetic particles can be transported from the first fluid chamber via the gaseous medium into the second fluid chamber filled with the liquid medium. Thus, the first fluid chamber comprises, e.g., no liquid medium. This allows transporting the magnetic particles first in a dry or semi-dry manner (e.g., only partly wetted with liquid) e.g., out of the first fluid chamber into the liquid medium of the second fluid chamber. Optionally, the magnetic particles can first come into contact with a liquid medium in a zeroth fluid chamber of the apparatus before the same are transported from the zeroth fluid chamber into the first fluid chamber to dry there by means of the method. Subsequently, the magnetic particles can be transported further into the liquid medium of the second fluid chamber by means of the method, wherein the liquid medium of the second fluid chamber can deviate from the liquid medium of the zeroth fluid chamber.

An embodiment of the present invention provides an apparatus for transporting magnetic particles comprising a substrate configured for rotation around an axis of rotation. Further, the apparatus comprises fluidic structures in the substrate, wherein the fluidic structures comprise a first fluid chamber, a second fluid chamber and a connection connecting the first fluid chamber to the second fluid chamber. Additionally, the apparatus comprises a magnetic force element configured to apply a magnetic force to the magnetic particles disposed in the fluidic structures depending on a positional relationship between the magnetic force element and the fluidic structures; and a drive configured to provide the substrate with a rotation around the axis of rotation, whereby the positional relationship between the magnetic force element and the fluidic structures changes continuously, and to apply a force to the magnetic particles during a rotation at an angle of 360° around the axis of rotation to transport the magnetic particles via the connection from the first fluid chamber into the second fluid chamber. The first fluid chamber and/or the second fluid chamber comprise, for example, no oblique chamber wall. Optionally, the first fluid chamber and/or the second fluid chamber can comprise the oblique chamber wall.

BRIEF DESCRIPTION OF THE DRAWINGS

Embodiments of the present invention will be detailed subsequently referring to the appended drawings, in which:

FIG. 5A is a schematic illustration of a top view of a step from a connection to a second fluid chamber of an apparatus according to an embodiment of the present invention;

FIG. 5B is a schematic three-dimensional illustration of a part of fluidic structures of an apparatus according to an embodiment of the present invention;

FIG. 5C is a schematic three-dimensional illustration of a part of fluidic structures of an apparatus in a side view according to an embodiment of the present invention;

DETAILED DESCRIPTION OF THE INVENTION

Before embodiments of the present invention will be discussed in more detail below, it should be noted that identical, functionally equal or equal elements, objects and/or structures are provided with the same or similar reference numbers in the different figures, such that the description of these elements illustrated in different embodiments is interchangeable or inter-applicable.

Figure 1:
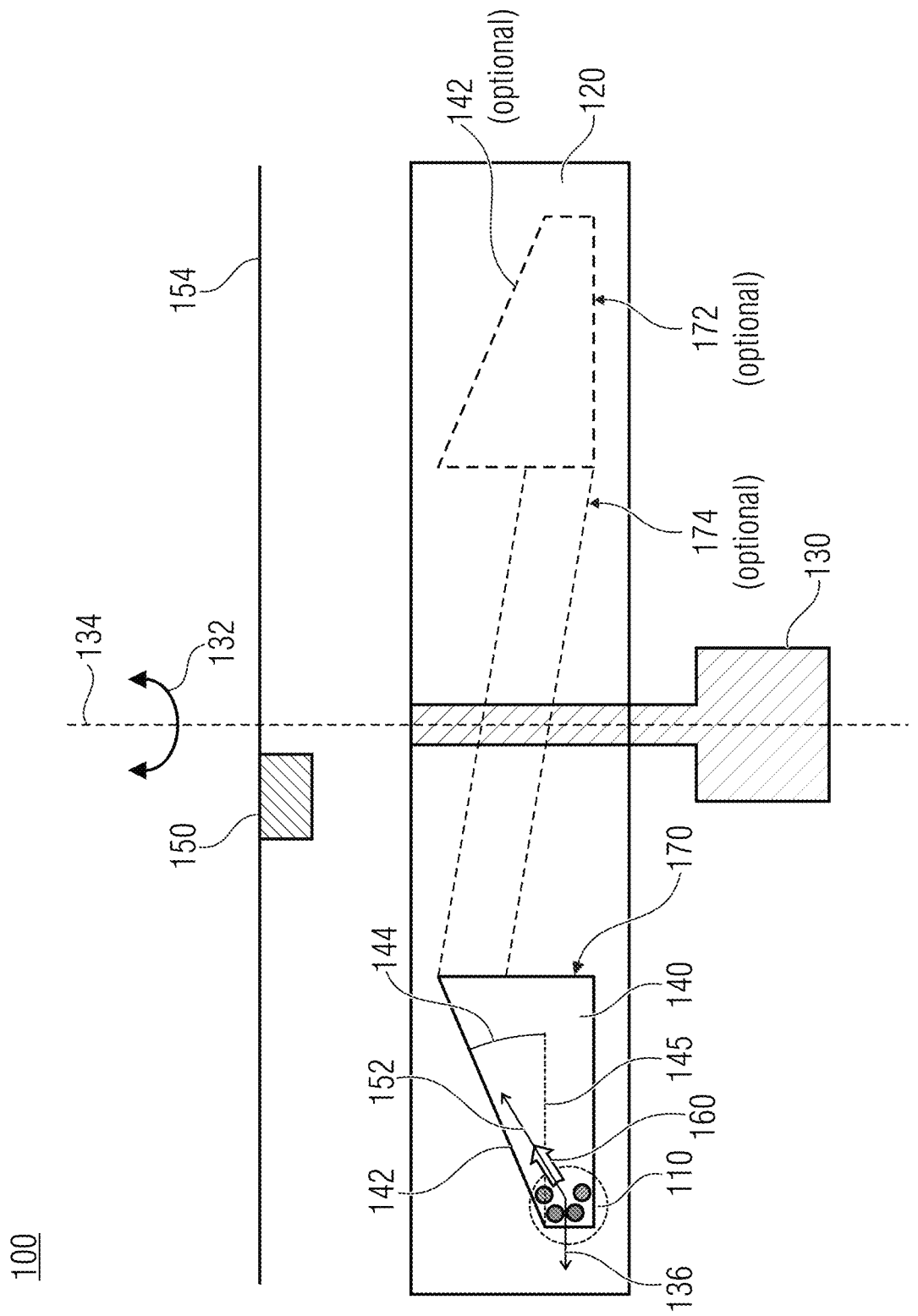
FIG. 1 is a schematic illustration of an apparatus according to an embodiment of the present invention.

FIG. 1 shows a schematic illustration of an apparatus 100 for transporting magnetic particles 110. The schematic illustration of FIG. 1 can illustrate a cross-section through the apparatus 100. The apparatus 100 can comprise a substrate 120 that can be configured for a rotation 132 around an axis of rotation 134. Further, fluidic structures 140 can be arranged in the substrate 120, which can comprise an oblique chamber wall 142 that can be arranged at an angle α 144 with respect to a plane 145 perpendicular to the axis of rotation 134. A magnetic force element 150 can be arranged radially inside the oblique chamber wall 142 with respect to the axis of rotation 134 and can be configured to apply a magnetic force 152 to the magnetic particles 110 disposed in the fluidic structures 140 depending on a positional relationship between the magnetic force element 150 and the fluidic structures 140, wherein the oblique chamber wall 142 is inclined towards the magnetic force element 150. Further, the apparatus 100 can comprise a drive 130 that can be configured to provide the substrate 120 with a rotation 132 around the axis of rotation 134, whereby the positional relationship between the magnetic force element 150 and the fluidic structures 140 changes continuously to thereby apply a force 160 to the magnetic particles 110 during a 360° rotation to transport the magnetic particles along the oblique chamber wall 142 and radially inwards with respect to the axis of rotation 134. The resulting force 160 is composed, among others, of the magnetic force 152 and the centrifugal force 136 and is only shown schematically in FIG. 1.

The force 160 that can act on the magnetic particles 110 can be composed, e.g., of the magnetic force 152 caused by the magnetic force element 150, of a centrifugal force 136 caused by the rotation 132 and frictional forces (e.g., friction between the magnetic particles 110, friction of the magnetic particles 110 at the oblique chamber wall 142, friction of the magnetic particles 110 at an environmental medium (e.g., a liquid or a gas) in the fluidic structures 140, etc.).

According to an embodiment, the drive 130 can be integrated in the substrate 120 or can be in contact with the substrate 120 to provide the substrate 120 with the rotation 132.

According to an embodiment, the drive 130 can be a mechanical apparatus (e.g., engine, clockwork, etc.).

According to an embodiment, the angle α 144 of the oblique chamber wall 142 can be in a range of 0° to 90° (0°<α<90°). The angle 144 can be adapted such that frictional forces of the magnetic particles 110 on a surface of the oblique chamber wall 142 are minimized and hence a high force 160 acts on the magnetic particles 110 radially inwards with respect to the axis of rotation, i.e., towards the axis of rotation 134. Depending on the positioning of the magnetic force element 150 and the fluidic structures 140, the angle α

144 can be adapted such that the oblique wall is inclined towards the magnetic force element 150 in an optimum manner.

According to an embodiment, the fluidic structures 140 can comprise recesses in the substrate 120, which can comprise the oblique chamber wall 142.

According to an embodiment, the magnetic force element 150 can be arranged on a stationary carrier 154 that is arranged on a side of the substrate 120, such that the magnetic force element 150 is arranged facing the oblique chamber wall 142. In that way, for example, no inner volume of the fluidic structures 140 should be arranged between the magnetic force element 150 and the oblique chamber wall 142, such that the oblique chamber wall 142 of the fluidic structures 140 is arranged facing the magnetic force element 150.

According to an embodiment, the fluidic structures 140 can comprise a first fluid chamber 170, a second fluid chamber 172 and a connection 174 connecting the first fluid chamber 170 to the second fluid chamber 172. According to FIG. 1, e.g., both the first fluid chamber 170 as well as the second fluid chamber 172 comprises the oblique chamber wall 142. The connection 174 is only shown schematically in FIG. 1 and can be illustrated in detail based on FIG. 4, FIG. 5A, FIG. 5B and FIG. 5C.

According to an embodiment, the apparatus 100 of FIG. 1 can be configured to transport the magnetic particles 110 from the first fluid chamber 170 via the connection 174 into the second fluid chamber 172. This transport takes place, for example, by means of controlling the rotation 132 by the drive 130 and the magnetic force element 150, which generates the force 160 by which the magnetic particles 110 can be transported from the first fluid chamber 170 into the second fluid chamber 172 along the connection 174. This transport is described, for example, in detail in FIGS. 6A-6C.

According to an embodiment, the connection 174 of FIG. 1 can comprise an inner wall whose radial position changes in azimuthal direction (e.g., in a direction of a unit vector of the rotation 132) towards the second fluid chamber 172 to change a position of the magnetic particles 110 during transport through the connection 174 both in azimuthal direction, from the first fluid chamber 170 in the direction of the second fluid chamber 172, as well as in a direction radially inwards with respect to the axis of rotation 134 when the substrate 120 is provided with rotational frequency lower than a critical rotational frequency. The radial position of the inner wall can change in azimuthal direction up to a turning point radially inwards and can change radially outwards after the turning point. The inner wall can be configured to stop the magnetic particles 110 due to the magnetic force 152 at this turning point when the substrate 120 is provided with a rotational frequency lower than the critical rotational frequency. After the turning point, the inner wall can be configured such that the same changes the position of the magnetic particles 110 both in azimuthal direction, in the direction of the second fluid chamber 172, as well as in a direction radially outwards with respect to the axis of rotation 134 when the substrate 120 is provided with a rotational frequency greater than the critical rotational frequency to transport the magnetic particles 110 into the second fluid chamber 172. Optionally, after the turning point, the inner wall can be configured such that the same changes the position of the magnetic particles 110 both in azimuthal direction, in the direction of the second fluid chamber 172, as well as in the direction radially outwards with respect to the axis of rotation 134, when the substrate is provided 120 with a rotational frequency greater than the critical rotational frequency to transport the magnetic particles 110 into the second fluid chamber 172. Further, the connection 174 can lead into the second fluid chamber 172 such that a step is formed at an orifice that can prevent, when a magnetic force 152 acts, transport of the magnetic particles 110 from the second fluid chamber 172 into the connection 174 and back to the first fluid chamber 170.

The specific configuration of the connection 174 can allow efficient transport of the magnetic particles 110 from the first fluid chamber 170 into the second fluid chamber 172 via the connection 174 in dependence on the direction. Here, the connection 174 can be configured such that a transport of the magnetic particles 110 can be very efficiently effected merely by the specific arrangement of the magnetic force element 150 with respect to the axis of rotation 134 and control of the rotation 132 by the drive 130. Further, the specific configuration of the connection 174 can be optimized such that the substrate 120 can be provided continuously with the rotation 132 by the drive 130 during the transport of the magnetic particles 110 and hence the rotation 132 does not have to be interrupted for transport.

In the following, the apparatus 100 of FIG. 1 will be described in more detail in other words.

Subject of the invention is the apparatus 100 and a method for transporting the magnetic particles 110 in a rotating system (e.g., in the substrate 120 provided with the rotation 132). The rotation 132 of the system is, e.g., permanent, i.e., the rotational frequency of the system is always unequal zero during the process.

Fluid chambers 170, 172, optionally filled with liquid, which are each separated by a gas volume (e.g., arranged in the connection 174) are provided in the system. The magnetic particles 10 are located, e.g., in at least one of the fluid chambers 170, 172.

The rotating system is arranged with respect to a stationary magnetic force element 150 such that a temporally and locally varying magnetic field is generated in the system in the fluid chambers 170, 172 during the rotation 132, which applies a magnetic force 152 to the magnetic particles 110, wherein the maximum magnetic force (the magnetic force is, e.g., proportional to grad (B)*B, i.e., "gradient of flow density*flow density", this term becomes larger with decreasing distance to the magnetic force element 150) on the magnetic particles 110 always exists when the fluidic structures 140 have the lowest distance to the magnetic force element 150. In radial direction, e.g., the magnetic force element 150 is closer to the center of rotation (e.g., the axis of rotation 134) than the liquid in the fluid chambers 170, 172.

In the rotating system and below a critical rotational frequency, the magnetic force 152 exceeds the forces counteracting the same: The centrifugal force 136 acting on the magnetic particles 110, a frictional force acting on magnetic particles moving within liquid as well as a surface tension of the medium (e.g., a liquid when the magnetic particles are located at a phase boundary (e.g., between the liquid and a gaseous medium)) where the magnetic particles 110 can be located. Thereby, the magnetic particles 110 move towards the center of rotation 134.

In the rotating system and above a critical rotational frequency, (mainly) the centrifugal force 136 exceeds the magnetic force 152 many times over, whereby the magnetic particles 110 move away from the center of rotation 134.

This allows a directed transport of the magnetic particles 110 from a first fluid chamber 170 to a second fluid chamber 172, since in the case the critical rotational frequency is undershot, the magnetic particles 110 perform a relative movement with respect to the rotating system.

Further, a value of the magnetic force 152 acting on the magnetic particles 110 in the rotating system can be varied by the geometry located thereon. Fluid chambers 170, 172 having varying depths result, for example, at varying distances of the magnetic particles 110 therein to the magnetic force element 150. This results, e.g., in areas in the fluid chambers 170, 172 where the magnetic particles 110 are preferably located and preferential directions in which the magnetic particles 110 move.

With skillful implementation, the above-stated apparatus 100 and the described methods allow, e.g., two functionalities for automated transport of the magnetic particles 110:
  a) The magnetic force 152 acting on the magnetic particles 110 in the transport direction can be increased in the area of a liquid-gas boundary in a fluid chamber 170, 172 in that the fluid chamber 170, 172 comprises an oblique chamber wall 142 towards the magnetic force element 150. Thereby, the portion of the magnetic force 152 used for particle transport is increased proportionally to the angle of inclination 144 of the oblique chamber wall 142 and the friction of the magnetic particles 110 at the oblique chamber wall 142 is decreased by the same factor. This eliminates, e.g., the necessity of interrupting the rotation for particle transport.
  b) By the backward-directed step with respect to a fluid chamber depth (parallel to the axis of rotation 134), a function of a diode with respect to the direction of transport of the magnetic particles 110 can be implemented.

The centrifugal microfluidic deals with handling liquids in the fL-mL range in rotating systems like the apparatus 100. The substrate 120 can optionally be realized as a disposable polymer cartridge that can be used together with or instead of centrifugal rotors with the intent of automating, e.g., laboratory processes. Here, standard laboratory processes such as pipetting, centrifuging, mixing or aliquoting can be implemented in a microfluidic cartridge like the substrate 120. For that purpose, the apparatus 100 optionally includes channels (e.g., the connection 174) for fluid guidance (e.g., liquid guidance) as well as fluid chambers 170, 172 for collecting liquids. The apparatus 100 can be provided with a predefined sequence of rotational frequencies, a frequency protocol, such that the liquids within the fluidic structures 140 can be moved by the centrifugal force 136. Centrifugal microfluidics is mainly applied in laboratory analysis and mobile diagnostics.

The apparatus 100 can be realized as a centrifugal microfluidic disc ("Lab-on-a-disk", "LabDisk", "Lab-on-CD", etc.) that is used in specific processing devices.

Here, the main fields of application of the apparatus 100 are, e.g., nucleic acid analysis, cell analytics, clinical chemistry or protein analytics. In these fields, frequently magnetic particles 110 having a size of 1 nm-1 mm (also called "beads") are used. Here, the magnetic particles 110 are usually used as mobile solid phase on which analytes (components of a sample to be analyzed in a test) present specifically or unspecifically in a matrix (entirety of a sample to the analyzed, examples: blood, urine, throat swab, saliva, etc.) can be bound. Such a process is called positive extraction. Negative extraction can be obtained by bonding all components of a sample apart from the analyte, wherein such a procedure is applied less frequently than positive extraction. In the described applications, the magnetic particles 110 prove to be advantageous since they can be manipulated with the help of an external magnetic field due to their magnetic characteristics. Examples for this are the stopping or collecting of the magnetic particles 110 in a suspension (e.g., in a liquid of the first fluid chamber 170) while the liquid of the same is exchanged, or mixing liquids by specific movement of the magnetic particles with the help of a magnetic field or the transfer of magnetic particles from one liquid to another.

The present invention relates to fluidic modules, apparatuses and methods for position control of the magnetic particles 110 in the rotating system. Thus, the apparatus 100 is configured to control the position and movement of the magnetic particles 110 during a process with minimum handling effort. The object of the process is, e.g., automated extraction of an analyte from a matrix or extraction of matrix components interfering with a subsequent analysis.

Thus, it has to be stated that the apparatus 100 can eliminate the need for, e.g. an interruption of the rotation 132, so that the rotational frequency is, e.g., the only variable process parameter whereby the apparatus 100 can transport particles in a very simple manner (herein, the magnetic particles 110 can also be referred to only as particles), restoring forces during the particle transport can be minimized by the inclination of the oblique chamber wall 142, the transport of the magnetic particles can be regulated in a guiding manner by the diode function by the backward-directed step, for example in the connection 174 from the first fluid chamber 170 to the second fluid chamber 172, and when a liquid is disposed in the fluid chamber (e.g., in the first fluid chamber 170), a radial position of a liquid-gas interface can be adjusted in a defined manner by the continuous rotation 132.

Figure 2:
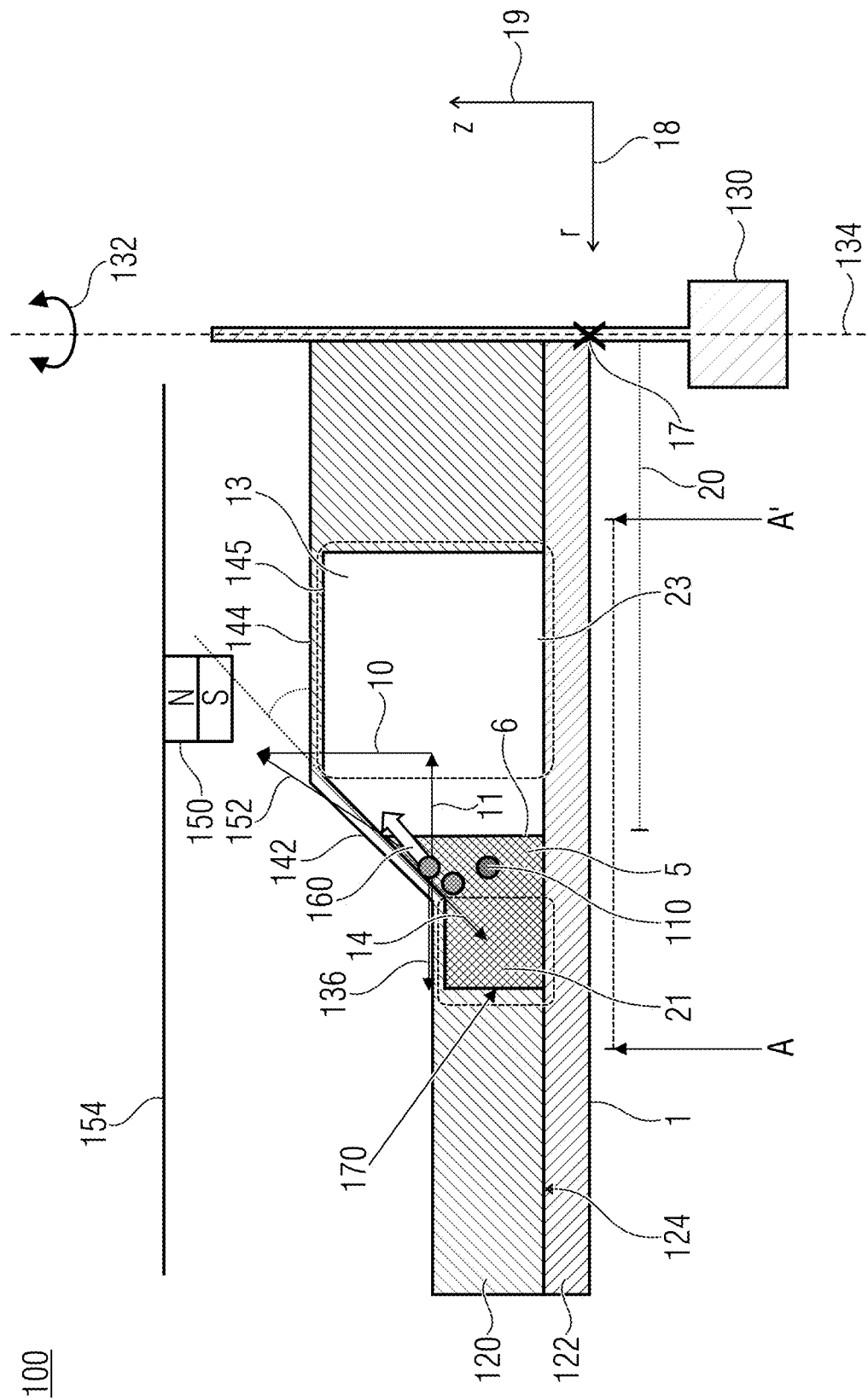
FIG. 2 is a schematic illustration of an apparatus comprising a liquid in fluidic structures according to an embodiment of the present invention.

FIG. 2 shows a schematic illustration of an apparatus 100 for transporting magnetic particles 110. FIG. 2 shows a sectional view through a fluidic module 1 of the apparatus 100. According to an embodiment of the present invention, the apparatus 100 can comprise the fluidic module 1 that is rotatable around a center of rotation 134 (can also be referred to as axis of rotation 134 below) by a drive 130, as well as a magnetic force element 150 that can be arranged opposite to the fluidic module 1.

The fluidic module 1 can comprise the substrate 120 and a sealing structure 122. Here, the sealing structure 122 can comprise the same material or a different material as the substrate 120. The substrate 120 can comprise recesses that can form a fluidic structure in the fluidic module 1. The fluidic structures arranged in the fluidic module 1 can comprise two or more fluid chambers 170 that can be partly filled with liquid 5 and gas 13. In the liquid 5 are, e.g., the magnetic particles 110. In the substrate 120, the two or more fluid chambers 170 can comprise recesses that can comprise an oblique chamber wall 142 and the two or more fluid chambers 170 can comprise a sealing structure 122 that can be arranged on a sealing area 124 of the substrate 120. Thus, the fluidic module can comprise fluidic structures such as the two or more fluid chambers 170 that are limited by the substrate 120 and the sealing structure 122, for example from all sides.

The fluidic module 1 can be described in a virtual coordinate system with the spatial directions r 18 and z 19, whose origin 17 is in the center of rotation 134. The sealing area 124 between the substrate 120 and the sealing structure 122 can represent a circular area, a circle sector/circle section, a rectangular area or a triangle area. Here, the axis of rotation 134 can be arranged, for example, in a center of a circular area, a pointed corner of the circle sector/circle section, in a center of a side of the rectangular area or at a corner of a triangle area. According to an embodiment, both the substrate 120 as well as the sealing structure 122 can have the same extensions as the sealing area 124 in a top view (parallel to the sealing area 124).

A phase boundary 6 is located, e.g., between the liquid volume 5 and the gas volume 13 in the fluid chamber 170. The phase boundary 6 is located, e.g., at a defined distance 20 in radial spatial direction r 18 from the center of rotation 134 as long as the fluidic module 1 rotates 132 around the center of rotation 134 at a rotational frequency. The rotational frequency can be selected such that a centrifugal force 136 acting on the liquid volume 5 exceeds capillary forces between the liquid volume 5 and the fluidic module 1 in the fluid chamber 170. With a variation of the rotational frequency, a position of the phase boundary 6 can be varied. Since the substrate 120 can be provided, e.g., continuously with the rotation 132 around the axis of rotation 134, the position of the phase boundary 6 is defined based on the distance 20, e.g., at any time.

The fluid chamber 170 is configured such that the oblique chamber wall 142 of the fluid chamber 170 facing the magnetic force element 150 is inclined, at the position of the phase boundary 6, at an angle α 144 pointing to the magnetic force element 150 with respect to a plane 145 perpendicular with respect to a horizontal (e.g., to the axis of rotation 134). The angle α 144 of the oblique chamber wall 142 can be in a range of α>0° to α<90°. Due to the fact that the position of the phase boundary 6 is arranged, for example, in the area of the oblique chamber wall 142, transport of the magnetic particles 110 can take place across the phase boundary 6 along the oblique chamber wall 142, which makes the transport of the magnetic particles 110 very fast and efficient. The oblique chamber wall 142 can also be referred to as inclined wall surface of the fluid chamber 170.

According to an embodiment, the magnetic force element 150 can be arranged radially inside the oblique chamber wall 142 with respect to the axis of rotation 134 and can be configured to apply a magnetic force 152 to the magnetic particles 110 disposed in the fluidic structures depending on a positional relationship between the magnetic force element 150 and the fluidic structures. The magnetic force element 150 can be arranged on a stationary carrier 154 that is arranged on a side of the substrate 120 that is opposite to the sealing area 124. The drive 130 can be configured to provide the fluidic module 1 with the substrate 120 and the scaling structure 122 with a rotation 132 around the axis of rotation 134, whereby the positional relationship between the magnetic force element 150 and the fluidic structures continuously changes and to thereby apply a force to the magnetic particles 110, e.g., during a 360° rotation, to transport the magnetic particles 110 along the oblique chamber wall 142 and radially inwards with respect to the axis of rotation 134. Because the magnetic force element 150 is arranged in a stationary manner on the carrier 154 and the fluidic module 1 is provided with the rotation 132 by means of the drive 130, e.g., the positional relationship between the magnetic force element 150 and the fluidic structures changes.

The stationary magnetic force element 150 generates, e.g., a magnetic field that generates a temporally changing magnetic field within a rotating system from the point of view of the fluid chamber 170, wherein the change of the magnetic field in such a fluid chamber 170 can be directly proportional to the rotational frequency ω of the rotating fluidic module 1. During a rotation, the magnetic field generates, e.g., net a resulting magnetic force $F_{mag}$ 152 that can act on the magnetic particles 110 as long as the same are within the magnetic field. Here, the vector of the magnetic force 152 can be divided into the directional vectors $F_{mag,r}$ 11 and $F_{mag,z}$ 10. Here, these two directional vectors can be described in a cylindrical coordinate system (r, θ, z), for example, as $F_{mag,r}$=(r, θ=0, z=0) and $F_{mag,z}$=(r=0, θ=0, z), wherein the following can apply: $F_{mag,z}$>$F_{mag,r}$. As indicated above, optionally, θ=0 can apply when the net acting magnetic force $F_{mag}$ is considered. A reason for this is illustrated in FIGS. 3a to 3c, which can represent top views on the fluid chamber 170 of the fluidic module 1.

Figures 3A, 3B, 3C:
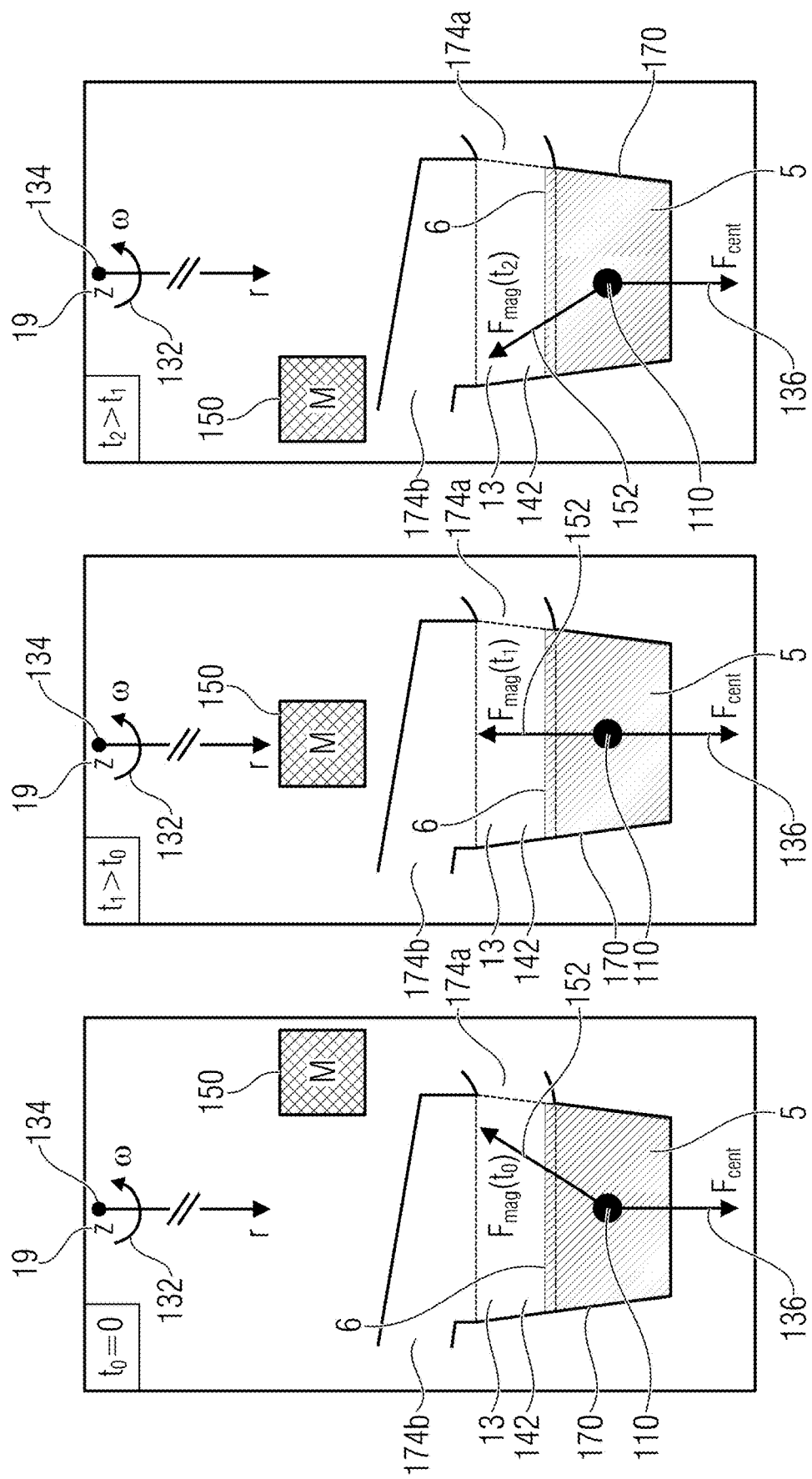
FIG. 3A is a schematic illustration of fluidic structures and a magnetic force element of an apparatus at a first time of a rotation of the fluidic structures according to an embodiment of the present invention.
FIG. 3B is a schematic illustration of fluidic structures and a magnetic force element of an apparatus at a second time of a rotation of the fluidic structures according to an embodiment of the present invention.
FIG. 3C is a schematic illustration of fluidic structures and a magnetic force element of an apparatus at a third time of a rotation of the fluidic structures according to an embodiment of the present invention.

FIGS. 3A to 3C show a positional relationship between a magnetic force element 150 and a fluid chamber 170 of fluidic structures of an apparatus 100 at different times of a rotation 132. The fluid chamber 170 comprises, for example, an oblique chamber wall 142, wherein a phase boundary 6 is arranged between a liquid volume 5 and a gas volume 13 in an area of the oblique chamber wall 142. The fluid chamber 170 can form part of the fluidic structures of the apparatus, wherein connections 174a, 174b can connect the fluid chamber 170 to further elements (such as further fluid chambers or connections) of the fluidic structures.

During a movement of the fluid chamber 170 below the magnetic force element M 150, a transient magnet force $F_{mag}(t)$ 152, which always points, e.g., in the direction of the magnetic force element 150 can act on a magnetic particle 110. For determining a net magnetic force, all $F_{mag}(t)$ between t=$t_0$ and t=$t_2$ (for t=$t_0$ see FIG. 3A, for t=$t_1$ see FIG. 3B and for t=$t_2$ see FIG. 3C), i.e., as long as the magnetic force 152 acts on a magnetic particles 110, can be added. This results, e.g., for the net magnetic force for the transport in directions r and z, in the magnetic force at the time $t_1$ ($F_{mag}$=$F_{mag}(t_1)$), wherein the net magnetic force can be calculated with the following formula for the described time period:

$$F_{mag} = \int_{t_0}^{t_2} F_{mag}(t)dt,$$

wherein the force acting on a magnetizable particle depends on the gradient of the magnetic flow density (grad(B(t))), the magnetic flow density B(t), the magnetic susceptibility of the particles $\chi_{mag}$, the magnetic susceptibility of the surrounding medium $\chi_{med}$, the volume of the magnetizable material $V_{Mag,Bead}$ as well as the vacuum permeability $\mu_0$ (constant):

$$F_{mag}(t) = \frac{V_{Mag,Bead} * (\chi_{mag} - \chi_{med})}{\mu_0} * (grad(B(t))) * B(t)$$

Relevant for the transport, a force having no more phi component results from this equation.

In other words, FIG. 3A, FIG. 3B and FIG. 3C show, in top view, a schematic illustration of centrifugal force $F_{cent}$ 136, as well as the magnetic force $F_{mag}(t)$ 152 on a magnetic particle 110 in the fluid chamber 170 at a time $t_0$ to $t_2$ at constant rotational frequency ω of the rotation 132. During that time, the fluid chamber 170, e.g., with the liquid 5 and the magnetic particle 110, passes once below the magnetic force element M 150.

According to FIG. 2, restoring forces can act on the magnetic particles 110 against the magnetic force 152. According to an embodiment, the same can correspond essentially, but not exclusively, to a sum of the centrifugal force 136 acting on the magnetic particles 110, frictional forces 14, e.g., in a case of a contact between the magnetic particles 110 and the oblique chamber wall 142, as well as a surface force at the phase boundary 6. Thus, the force 160 by which the magnetic particles 110 can be transported through the apparatus 100 within the fluidic structures can be composed of different forces as described above.

The centrifugal force $F_{cent}$ 136 acting on a particle 110 is calculated, e.g., as a function of the rotational frequency $\omega$ over:

$$F_{cent}(\omega) = V_{bead} * (\rho_{Bead} - \rho_{amb}) * \omega^2 * r,$$

with the volume $V_{Bead}$ and the density $\rho_{Bead}$ of the particle 110, the density $\rho_{Amb}$ of the fluid surrounding the particle 110 (for example fluid 5 or gas 13) and the distance r of the particle 110 to the center of rotation 134.

The surface $F_{surf}$ to be overcome for transporting the particle 110 through the phase boundary 6 results, for example, as follows:

$$F_{surf} = 6^{\frac{1}{3}} * \pi^{\frac{2}{3}} * \sigma_{liquid} * V_{Bead}^{1/3},$$

with a surface tension $\sigma_{liquid}$ and a total volume $V_{Bead}$ of the particle 110.

Further, a frictional force 14 acts, e.g., on a particle 110 moving within the fluid 5. This frictional force 14 is referred to as Stokes-Drag $F_{Drag}$:

$$F_{Drag} = 6 \pi \eta a v_0,$$

wherein $\eta$ represents the dynamic viscosity of the fluid 5 surrounding the particle 110, a the radius of the round particle 110 and $v_0$ the relative velocity of the particle 110 to the medium.

Thus, an equilibrium of forces between the magnetic force on the one hand and the restoring forces on the other hand can be influenced with the help of the rotational frequency $\omega$ and an accompanying increase or decrease of the centrifugal force on the particle. Additionally, with decreasing rotational frequency, the remaining period of the particle in the magnetic field is increased, which again results in an increase of the effective period of the magnetic force $F_{mag}$.

The fluid chamber 170 can have areas with varying extensions in z direction 19 (e.g., varying depths), such as flat chamber areas 21 (small extension in z direction 19) and deep chamber areas 23 (large extension in z direction 19), wherein a wall of the deep chamber areas 23 facing the magnetic force element 150 is arranged at a shorter distance to the magnetic force element 150 compared to the flat chamber area 21. Thereby, a higher magnetic force 152 acts, e.g., on the magnetic particles 110 that are disposed, e.g., on a wall of the fluid chamber 170 facing the magnetic force element 150, compared to the flat chamber area 21, since, in addition to the portion $F_{mag,r}$ 11, a portion of the magnetic field force $F_{mag,z}$ 10 depending directly on the angle of inclination $\alpha$ 144 can be used for transfer.

According to an embodiment, the fluid chamber 170 can have a lower extension parallel to the axis of rotation 134 in a radially outer portion 21 with respect to the axis of rotation 134 than in a radially inner portion 23. Further, the fluid chamber 170 can comprise a radial central portion that can be arranged between the radially inner portion 23 and the radially outer portion and comprises the oblique chamber wall 142 that can connect the radially inner portion 21 to the radially outer portion 23.

Embodiments of the invention are based on the finding that, by skillfully using the advantages of a centrifugal microfluidic system (e.g., the apparatus 100), it is possible to transport the magnetic particles 110 from one fluid chamber 170 into a further fluid chamber with minimum handling effort and without interrupting the rotation 132 of the system. Additionally, by skillfully selecting the fluid chamber geometry, this opens up the possibility of increasing the portion of the magnetic force 152 acting on the magnetic particles 110 in transport direction and providing preferred locations of the magnetic particles 110.

Application examples for the invention are in the field of DNA sequencing, nucleic acid purification, solid phase PCR, surface chemistry, protein purification, cell extraction, immunoassays, immunoprecipitation as well as sample preparation for mass spectroscopy and in any application where an analyte and a matrix are to be separated from each other.

For usage in the apparatus 100 or in an inventive method, a magnetic core of the magnetic particles 110 can have paramagnetic, ferromagnetic or ferrimagnetic characteristics. A particle shell of the magnetic core of the magnetic particles 110 can comprise, e.g., silica material ($SiO_2$), polymers, bio(chemically) modified surfaces (e.g., with oligo-nucleotides, polypeptides), metal materials and cellulose materials.

A volume range of the liquid 5 in the fluid chamber 170 can be in a range of 50 nL to 50 mL, 500 nL to 10 ml or 1 µL to 5000 µL.

The magnetic force element 150 can comprise a rare earth magnet, e.g., NdFeB, an electromagnet or a soft-iron magnet.

Optionally, the apparatus 100 comprises one or several magnetic force elements 150. Here, the apparatus 100 can comprise different magnetic force element arrangements. According to an embodiment, the apparatus 100 can thus comprise at least one magnetic force element 150 radially inside the liquid-gas boundary 6 (as, e.g., illustrated in FIG. 2). Radially inside can mean that the magnetic force element 150 has a radial position that has a shorter distance to the axis of rotation 134 than the liquid-gas boundary 6. According to an embodiment, the apparatus 100 can also comprise two or more magnetic force elements 150 that can be arranged at different radial positions or at the same radial position (but, e.g., at different positions along the z direction 19 or an angular direction θ/azimuthal direction). With two or more magnetic force elements 150, as long as a first magnetic force element 150 is arranged radially inside the liquid-gas boundary 6, a second magnetic force element can be arranged radially outside the liquid-gas boundary 6 as long as the magnetic force 152 applied to the magnetic particles 110 by the second magnetic force element is weaker than the magnetic force by the first magnetic force element 150. Thus, the transport of the magnetic particles 110 through the apparatus 100 can be optimized by applying a high magnetic force 152 to the magnetic particles 110.

An advantage of the invention with respect to current technology is, for example, the skillful usage of the centrifugal force 136 acting on the liquid 5. Due to the permanent rotation 132 of the fluidic module 1, defined states and hence filling levels of the liquids 5 result in all fluid chambers 170 of the fluidic module 1, e.g., at any time, i.e., the phase boundary 6 between liquid 5 and gas phase 13 is, for example, on a defined isoradial circular path with respect to the axis of rotation 134 which can be freely adjusted by changing the fluid chamber geometry and radial chamber positions. This state allows quantitative prediction and implementation of the magnetic force 152 acting on the magnetic particles 110 at exactly that phase boundary 6 and the restoring forces acting at this location, i.e., the surface force at the phase boundary. Further, this allows that the magnetic force 152 acting on the magnetic particles 110 is constant at the entire phase boundary 6.

Permanently maintaining the rotation 132 of the fluidic module 1 allows selecting the centrifugal force 136 acting on the liquid 5 during the entire process such that the same exceeds the capillary forces occurring between the liquid 5 and the chamber walls. Thereby, undesired passive liquid transport ("cross talk" by Concus-Finn condition) by means of capillary forces from one fluid chamber 170 into one or several other fluid chambers 170 can be prevented.

Advantages of the apparatus 100 compared to current technology result from the angle of inclination 144 of the oblique chamber wall 142 pointing towards the magnetic force element 150 at the location of the phase boundary 6. Selecting the angle 144 allows increasing the magnetic force 152 effectively contributing to the transport of magnetic particles 110 to the center of rotation (the axis of rotation 134). Additionally, selecting the described angle of inclination 144 allows selective adjustment of the critical rotational frequency, at which the magnetic particles 110 in different fluid chambers 170 with the same liquid 5 but different angles of inclination 144 of the oblique chamber wall 142 can overcome the phase boundary 6.

Further advantages of the invention result from the possibility of controlling particle movements both inside the fluid chamber 170 as well as between different fluid chambers 170, but without interrupting the rotation 132 of the fluidic module 1, which can reduce the duration of such processes.

An advantage of the invention results from the inclination of the inner edge of the fluid chamber 170 with respect to its radial position. This geometry makes it possible to transport magnetic particles 110 from one fluid chamber 170 into a further fluid chamber in connection with a magnetic force element 150 at a suitable radial position without interrupting the rotation 132 of the fluidic module 1 during this process. For this, the magnetic force element 150 has to be arranged such that the magnetic force 152 moves the magnetic particles 110 towards the center of rotation at each location of the edge (oblique chamber wall 142).

One advantage of the present invention is the implementation of a barrier (diode function) which prevents, by a backward-directed step in the depth of the fluid chamber, transport of the magnetic particles opposite to the intended transport path (e.g., from the first fluid chamber 170 to the second fluid chamber 172 and from the second fluid chamber 172 to the third fluid chamber 173 (see FIG. 4)). In an exemplary arrangement, where a fluid chamber A 172 is located between a fluid chamber B 173 and a fluid chamber C 170, the transport of magnetic particles from fluid chamber A 172 into the fluid chamber C 170 can be prevented by implementing a backward-directed step (for example at the transition of the connection $174_1$, $174_2$ to the respective fluid chamber 172, 173) between the fluid chamber C 170 and A 172, while the transport of magnetic particles in the directions C-A and A-B is possible.

Figure 4:
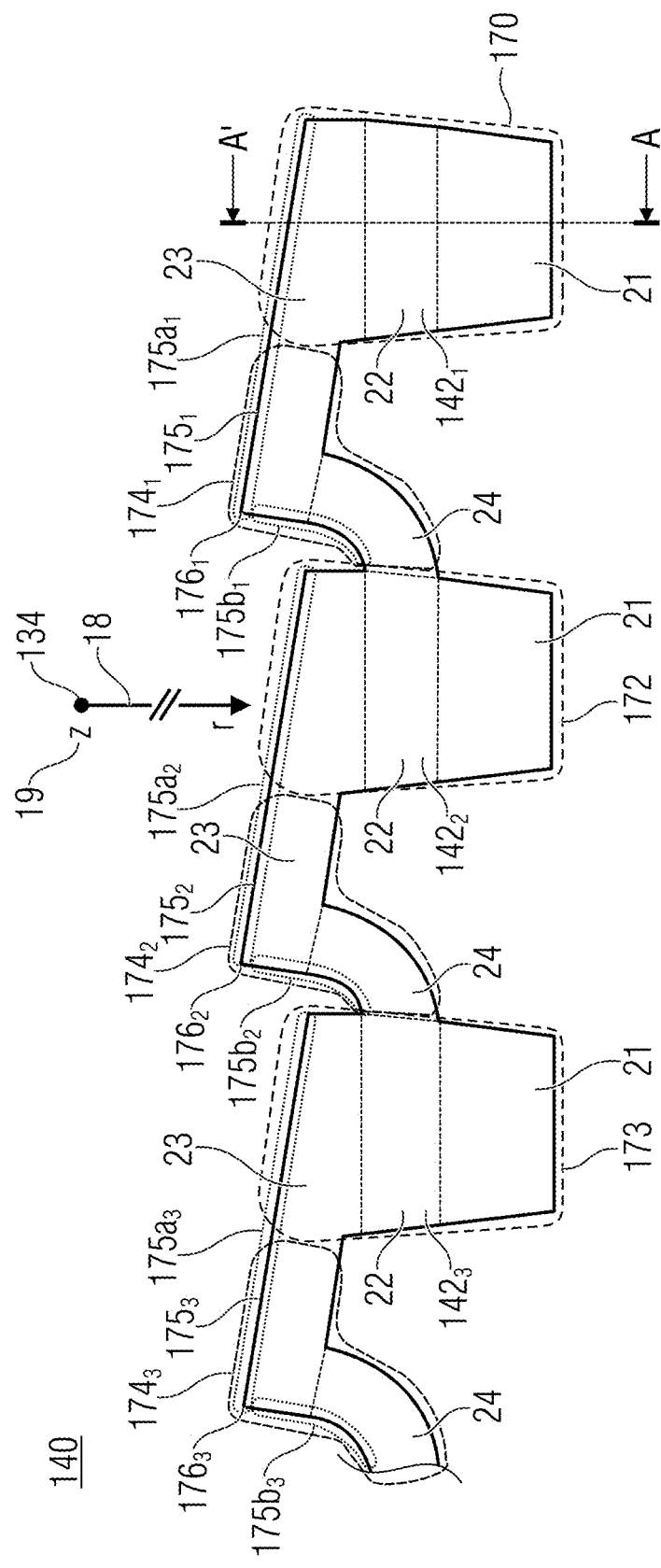
FIG. 4 is a schematic illustration of fluidic structures of an apparatus according to an embodiment of the present invention.

FIG. 4 shows a section of fluidic structures 140 that can be arranged in a substrate of an apparatus. The fluidic structures 140 can comprise a first fluid chamber 170, a second fluid chamber 172, a third fluid chamber 173 up to an n-th fluid chamber (wherein n defines, e.g., an integer positive number). Each of the fluid chambers 170, 172, 173 can comprise an oblique chamber wall $142_1$ to $142_3$. The individual fluid chambers 170, 172, 173 can be connected to one another via connections $174_1$ to $174_3$.

According to an embodiment, the connections $174_1$ to $174_3$ can comprise an inner wall $175_1$ to $175_3$ whose radial position (e.g., along the spatial direction r 18) changes in azimuthal direction (e.g., from the first fluid chamber 170 towards the second fluid chamber 172 and/or from the second fluid chamber 172 towards the third fluid chamber 173) to change a position of magnetic particles that can be disposed in one of the fluid chambers 170, 172, 173 during transport through the connection $174_1$ to $174_3$ both in azimuthal direction as well as in a direction radially inwards with respect to an axis of rotation 134, when the substrate in which the fluidic structure 140 can be arranged is provided with a rotational frequency lower than a critical rotational frequency. In other words, the fluidic structure 140 can comprise a connection $174_1$ to $174_3$ that can have an inner wall $175_1$ to $175_3$ radially inwards that has a negative gradient with respect to the radial position. The inner wall $175_1$ to $175_3$ can be a continuation of a chamber wall of the fluid chamber 170, 172, 173 located radially inwards. The inner wall $175_1$ to $175_3$ can also be referred to as inner edge of the connection $174_1$ to $174_3$.

According to an embodiment, the radial position of the inner wall $175_1$ to $175_3$ can change radially inwards in azimuthal direction up to a turning point $176_1$ to $176_3$ and the radial position can change radially outwards starting from the turning point $176_1$ to $176_3$, wherein the inner wall $175_1$ to $175_3$ can be configured to stop the magnetic particles at this turning point $176_1$ to $176_3$ due to a magnetic force when the substrate, in which the fluidic structures 140 are arranged, is provided with the rotational frequency lower than the critical rotational frequency. Here, the magnetic particles can be stopped in an area around the turning point $176_1$ to $176_3$. This can take place, for example, due to the inner wall $175b_1$ to $175b_3$ running radially outwards, by the magnetic particles being arranged, for example, in the area around the turning point $176_1$ to $176_3$ at the inner wall $175b_1$ to $175b_3$ running radially outwards.

Thus, the connection comprises an inner wall $175_1$ to $175_3$ with a part $175a_1$ to $175a_3$ running radially inwards and a part $175b_1$ to $175b_3$ running radially outwards. Thus, for example in a part $175a_1$ to $175a_3$ running radially inwards, a distance to the axis of rotation 134 can decrease in azimuthal direction, e.g., from the first fluid chamber 170 towards the second fluid chamber 172 or from the second fluid chamber 172 towards the third fluid chamber 173, and a distance of the part $175b_1$ to $175b_3$ of the inner wall $175_1$ to $175_3$ running radially outwards can increase in azimuthal direction (as already described above) with respect to the axis of rotation 134.

According to an embodiment, after the turning point $176_1$ to $176_3$, the inner wall $175_1$ to $175_3$ can be configured such that when the substrate is provided with a rotational frequency greater than the critical rotational frequency, the position of the magnetic particles is changed in a direction radially outwards with respect to the axis of rotation 134 to transport the magnetic particles into the second fluid chamber 172 when the magnetic particles come out of the first fluid chamber 170, or into the third fluid chamber 173 when the magnetic particles come out of the second fluid chamber 172.

According to an embodiment, after the turning point $176_1$ to $176_3$, the inner wall $175_1$ to $175_3$ can be configured such that when the substrate is provided with a rotational frequency greater than the critical rotational frequency, the position of the magnetic particles is changed both in azimuthal direction (as already described above) as well as in a direction radially outwards with respect to the axis of rotation 134 to transport the magnetic particles into the second fluid chamber 172 when the magnetic particles come out of the first fluid chamber 170, or into the third fluid chamber 173 when the magnetic particles come out of the second fluid chamber 172.

Thus, FIG. 4 shows an embodiment of the fluidic structures 140 in a top view with three fluid chambers 170, 172, 173. Embodiments include fluid chambers 170, 172, 173 comprising areas of varying extensions in z direction 19 (varying depths), such as flat chamber areas 21, 24 and deep chamber areas 23. Compared to the flat chambers areas 21, 24, the deep chamber areas 23 can be arranged at a shorter distance to a magnetic force element, wherein the distance runs in z direction 19.

Embodiments include fluid chambers 172, 173 that have a transition from the flat area 24 into a deeper area 22, wherein the transition represents a backward-directed step as long as magnetic particles are moved from the flat area 24 into the deeper areas 22. The backward-directed step can prevent that the magnetic particles move from the deeper area 22 into the flatter area 24 (during transport by the apparatus), whereby the apparatus with fluidic structures 140 according to FIG. 4 can be configured to transport the magnetic particles always only in one direction, e.g., from the first fluid chamber 170 into the second fluid chamber 172 and from the second fluid chamber 172 into the third fluid chamber 173. The fluidic structures 140 can also be described as microfluidic structures.

According to an embodiment, the connection $174_1$ can comprise a first channel portion 23 that is not radially decreasing, which leads into the first fluid chamber 170, and a second radially decreasing channel portion 24, which can lead into the second fluid chamber 172.

FIG. 5A shows a section of the fluidic structures 140 of FIG. 4 that can have the same features and functionalities as the fluidic structures 140 of FIG. 4, wherein additionally the backward-directed step 190 is inserted as diode function. By skillfully selecting chamber depths of the fluidic structure 140, the diode function 190 with respect to particle transport by an apparatus according to the present invention can be implemented. The implementation of a backward-directed step 190 in z direction 19 can result in a preferred path of magnetic particles out of the fluid chamber 172 (in this case to the left). Thereby, undesired transport of magnetic particles (in this case to the right) can be prevented.

The fluid chamber 172 and a connection $174_1$ can comprise a flat area 21, 24 having an extension in z direction 19 in a range of 1 μm to 1000 cm, 100 μm to 1 cm or 1 mm to 5 mm, such as 3 mm. Further, the fluid chamber 172 can comprise a deep area 23 whose extension can be in a range of 1 μm to 10 cm, 100 μm to 1 cm or from 1 mm to 5 mm, such as 4 mm. The flat area 21 and the deep area 23 of the fluid chamber 172 can be connected across a deeper area 22 via an oblique chamber wall $142_2$. The connection $174_1$ can lead into the deeper area 22 with the flat area 24, which can result in the backward-directed step 190.

In other words, the connection $174_1$ can comprise a first channel portion 23 and a second channel portion 24, wherein the second channel portion 24 can comprise areas that are spaced further apart from a magnetic force element in a direction parallel to the axis of rotation 134 (e.g., parallel to the z direction 19) than the first channel portion 23. Thus, the first channel portion 23 can have a greater extension (see the extension 23 in FIG. 5B and FIG. 5C) parallel to the axis of rotation 134 than the extension (see the extension 24 in FIG. 5B and FIG. 5C) of the second channel portion 24 parallel to the axis of rotation 134.

Thus, a drive of an apparatus can be configured to provide a substrate with a rotational frequency lower than a critical rotational frequency, wherein the magnetic particles are moved along the first channel portion 23 by the magnetic force and to provide the same with a second rotational frequency greater than the critical rotational frequency, wherein the magnetic particles are moved centrifugally along the second channel portion 24 into the second fluid chamber 172.

With the three-dimensional illustration of the fluidic structures 140 in FIG. 5B in 5c, the backward-directed step 190 can be explained in more detail. The fluidic structures 140 in FIG. 5B and FIG. 5C can represent part of the fluidic structures 140 of FIG. 4 and can hence comprise, for example, the same features and functionalities as part of the fluidic structures 140 in FIG. 4. In FIG. 5B and FIG. 5C, for example, a fluid chamber 172, a connection $174_1$ and a terminal $174_2$ to a further connection are illustrated. In FIG. 5B and FIG. 5C, the different extensions within the fluidic structures 140 in the z direction 19, such as already illustrated in FIG. 5A, become clear. Thus, the fluidic structures 140 of FIG. 5B and FIG. 5C can comprise, for example, deep areas with a large extension 23 and flat areas with a flat extension 21, 24 in z direction 19. The fluid chamber 172 can comprise an oblique chamber wall $142_2$ whose deeper extension 22 in z direction 19 increases along the oblique chamber wall $142_2$ from the flat extension 21 to the deep extension 23. Thus, the connection $174_1$ can lead into the fluid chamber 172 such that an area of the connection $174_1$ with the flat extension 24 leads into an area of the deeper extension 22 and/or the deep extension 23 of the fluid chamber 172, such that the backward-directed step 190 results due to the extension differences.

According to FIG. 5C, the areas with deep extension 23 can have a shorter distance to a magnetic force element in the z direction 19 than the areas with the flat extension 21, 24. Thus, magnetic particles in the fluid chamber 172 can be transported, during rotation of the fluidic structures 140 in a fluidic module of an apparatus, by the magnetic force element 150 within the fluid chamber 172, from a flat area with a flat extension 21, 24 along the oblique chamber wall $142_2$ into the deep area with the deep extension 23 to the terminal $174_2$. As the magnetic particles are hence transported in z direction 19 in the direction of the magnetic force element, the backward-directed step 190 can prevent that the magnetic particles are transported from the fluid chamber 172 into the connection $174_1$. The fluidic structures 140 can rotate in the substrate of the apparatus with respect to the magnetic force element in azimuthal direction opposite to the transport direction of the magnetic particles.

Figure 6A:
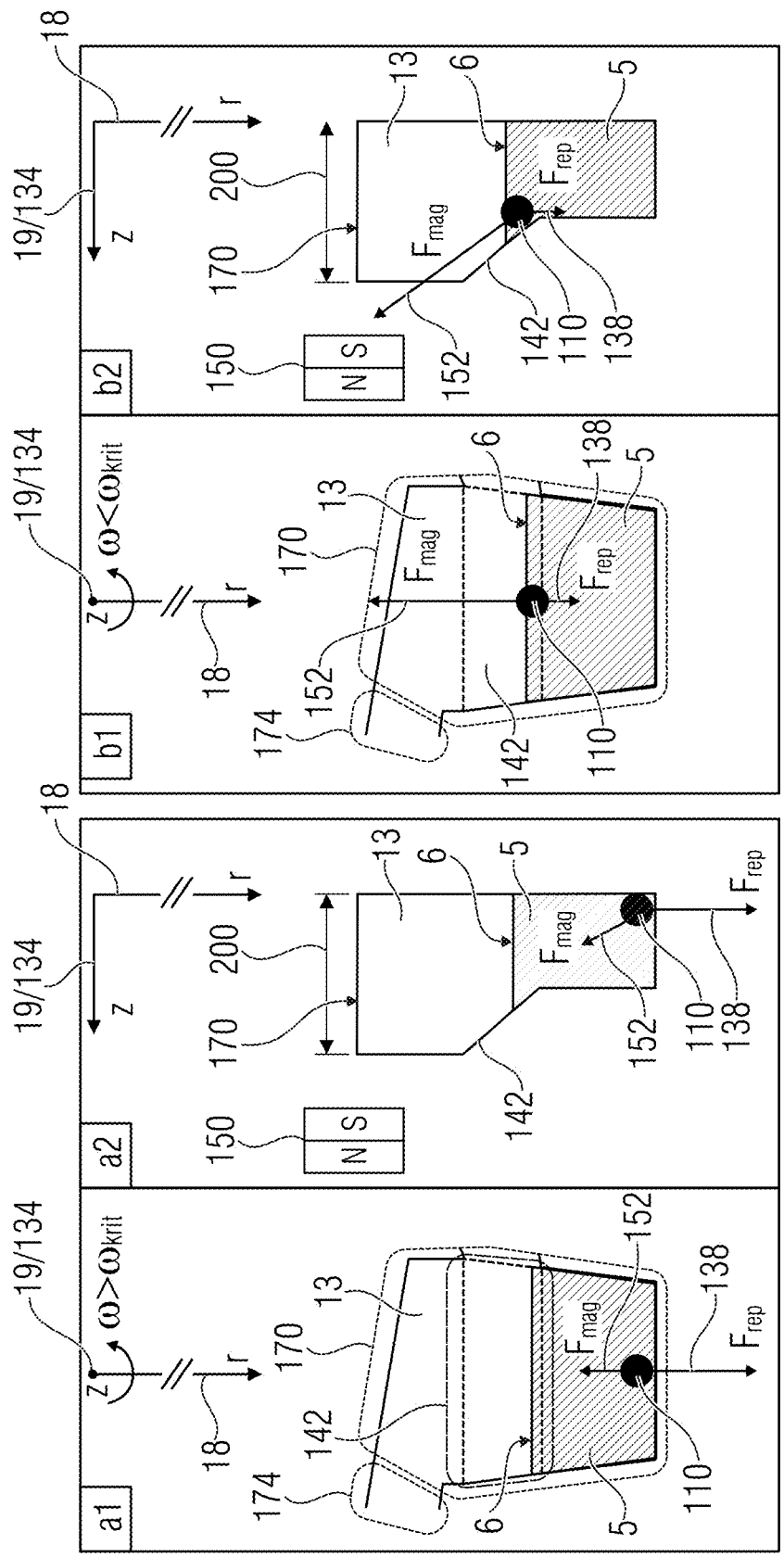
FIGS. 6A-6C are a schematic illustration of a transport of magnetic particles with an apparatus according to an embodiment of the present invention.
Figure 6B:
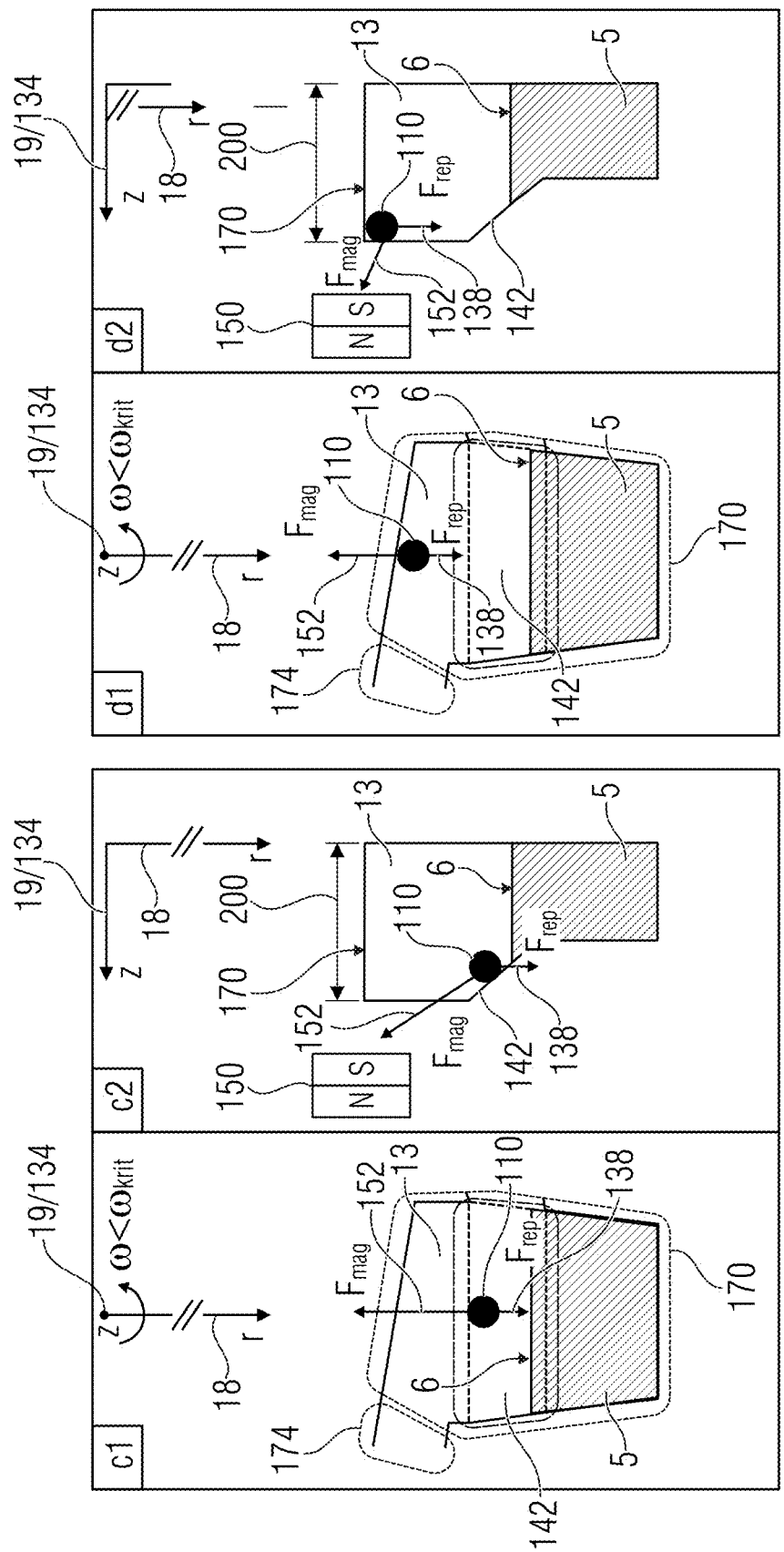
Figure 6C:
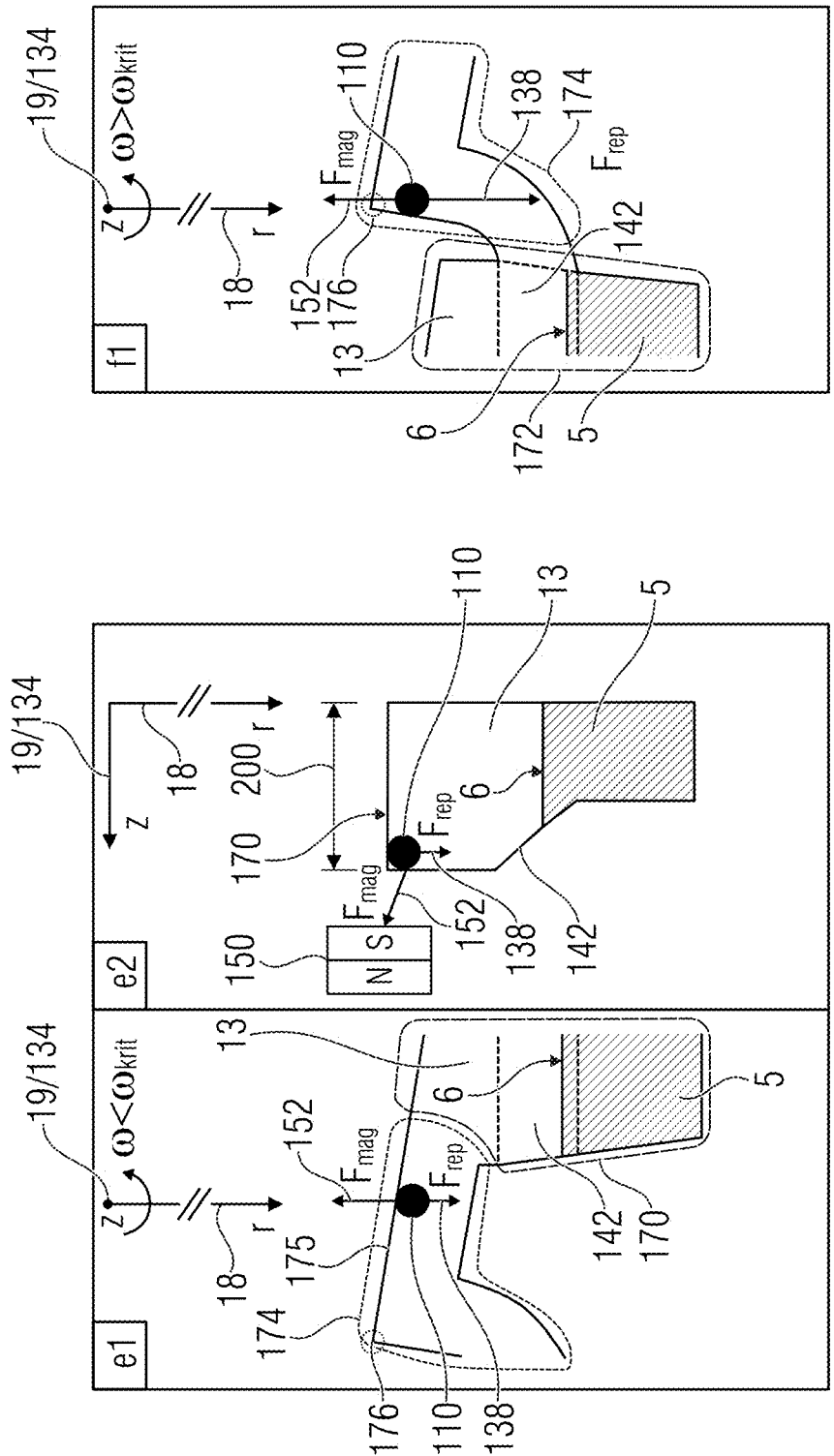

FIGS. 6A-6C show a fluid chamber 170 and a connection 174 to a second fluid chamber 172, each in a top view (index 1) and the side view (index 2) at six times a to f. In other words, for each substep, one top view (index "1") and one radial section (index "2") through the fluid chamber 170 are shown.

Liquid 5 can be disposed in the fluid chamber 170 and a magnetic particle 110 can be disposed in the liquid 5 at a first time a1/a2 and at a second time b1/b2. At a high rotational frequency ω (above the critical rotational frequency $ω_{krit}$), high centrifugal force acts on the magnetic particle 110, such that a total restoring force 138 acting on the magnetic particles exceeds a magnetic force 152 (see a1 and a2), wherein the total restoring force 138 represents a sum of restoring forces, such as a frictional force between particle and liquid medium and/or a frictional force between particle and chamber walls of the fluid chamber 170 as well as the centrifugal force. Thus, the magnetic particles 110 sediment, e.g., in the fluid chamber 170.

As soon as the critical rotational frequency $\omega_{krit}$ is undershot, the magnetic force 152 exceeds the total restoring force 138 and the magnetic particles 110 start moving towards the center of rotation 134 in r direction 18 and in z direction 19 (see b1 and b2). During the movement of the magnetic particles 110 in the liquid 5, the total restoring force 138 acts opposite to the magnetic force 152, consisting of a sum of the centrifugal force and Stokes force, caused by flow resistance. As soon as the magnetic particles 110 reach an interface (e.g., a phase transition) between liquid 5 and gas 13, the magnetic force 152 counteracts the total restoring force 138 consisting of the sum of surface force, centrifugal force 136 and Stokes force. Thus, the total restoring force 138 ($F_{rep}$) represents the sum of the restoring forces, wherein the same changes depending on the location of the magnetic particles 110.

A portion of the used magnetic force 152 during a transfer of the magnetic particles 110 through the interface 6 between liquid 5 and gas 13 can be increased by an oblique chamber wall 142 (see c1 and c2). Here, an inclination of the oblique chamber wall 142 with respect to an r-θ plane at an angle $0°<\alpha<90°$ results in an increase of the used magnetic force 152.

The magnetic force 152 on the magnetic particles 110 that are located in the gas phase 13 (see c1-e1, c2-e2) can be increased further by reducing a distance of the fluid chamber 170 to a magnetic force element 150. This is possible by a respective selection of chamber depth 200.

When skillfully selecting a radial position of the magnetic force element 150, the magnetic force 152 on the magnetic particles 110 always acts in the direction of the center of rotation 134. A wall 175 of the connection 174 at the radially inner side (see d1 and d2), which is inclined with respect to the radius, can be used to support transport of the magnetic particles 110 in an azimuthal direction (e.g., from a first fluid chamber 170 into a second fluid chamber 172) with the magnetic force 152.

During the transport of the magnetic particles 110 into the second fluid chamber 172 (see e1 and e2), the centrifugal force decreases further since the radial position of the magnetic particles 110 decreases.

As soon as the magnetic particles 110 are above the next fluid chamber 172 (e.g., in an area around a turning point 176) (see f1), the magnetic particles 110 can be propelled into the second fluid chamber 172 by increasing the rotational frequency ω. For this, the rotational frequency ω should be greater than the critical rotational frequency $\omega_{krit}$.

Thus, FIGS. 6A-6C shows a control of a particle transport through an apparatus 100 according to an embodiment of the present invention via a rotational frequency ω.

Figure 7:
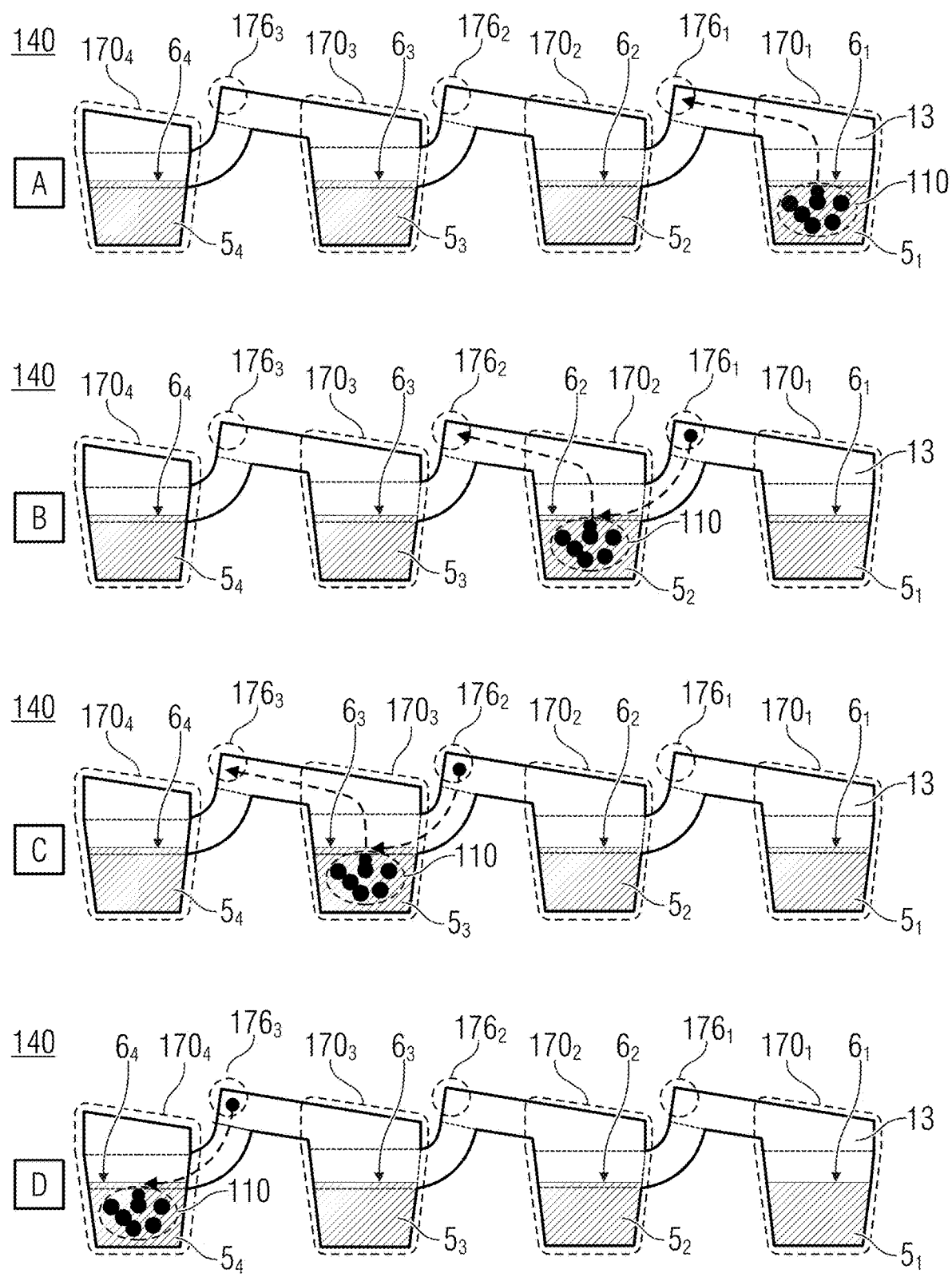
FIG. 7 is a schematic illustration of an application example of an apparatus and a method according to an embodiment of the present invention.

FIG. 7 shows a specific field of application of the described method and the apparatus (e.g., as microfluidic cartridge) for automatic extraction of nucleic acids from a solution of intact organisms or already digested organisms ("lysate"). In the example, four fluid chambers $170_1$ to $170_4$ are filled with liquids 51 to 54, wherein the liquids 51 to 54 can differ from each other. The four fluid chambers $170_1$ to $170_4$ represent an embodiment of fluidic structures 140 that can be integrated in a substrate of an inventive apparatus. The liquids 51 to 54 can, for example, be provided in the microfluidic cartridge (apparatus) in stick packs that are located, for example, radially inside the fluid chambers $170_1$ to $170_4$ in FIG. 7. By rotating the cartridge, the liquids 51 to 54 can reach the fluid chambers $170_1$ to $170_4$. The lysate can be obtained by chemical, mechanical or thermal decomposition of human, animal, plant or microbial bacterial material. The magnetic particles 110 have, for example, a silica surface that allows unspecific bonding of nucleic acids to the surface under specific chemical conditions. The magnetic particles 110 can be present in a dry state in the first fluid chamber $170_1$ and can be re-suspended by adding a lysate and a binding buffer. This state is illustrated in FIG. 7-A. In the starting state 7-A, the magnetic particles 110 are within a solution. Here, the microfluidic cartridge always rotates at a rotational frequency greater than the critical rotational frequency. During that time, nucleic acids can bond to the surface of the magnetic particles 110. If a critical rotational frequency is undershot, the magnetic particles 110 move, due to the altered force ratios, radially inwards across the phase boundary 61 to 64 between liquid 51 to 54 and gas 13 and in the direction of the next fluid chamber, wherein the same are stopped at a stopping point $176_1$ to $176_3$ (in other words, e.g., at a turning point) due to the chamber geometry (dotted arrow). In FIG. 7-B, the rotational frequency is increased, such that a critical rotational frequency is exceeded and the particles 110 are moved into a second fluid chamber $170_2$ by the predominant centrifugal force. The same can, for example, include a washing liquid 52 removing substances interfering with subsequent analyses. By implementing further changes of the rotational frequency for exceeding or falling below a critical rotational frequency, the particles 110 can be transported accordingly, e.g., into a second washing liquid 53 for further removal of interfering substances (FIG. 7-C) and successively, e.g., into an elution buffer 54 (FIG. 7-D) serving to dissolve, e.g., the nucleic acids from the silica surface of the particles 110. The resulting eluate includes purified nucleic acids and can be used for further downstream analyses.

Figure 8:
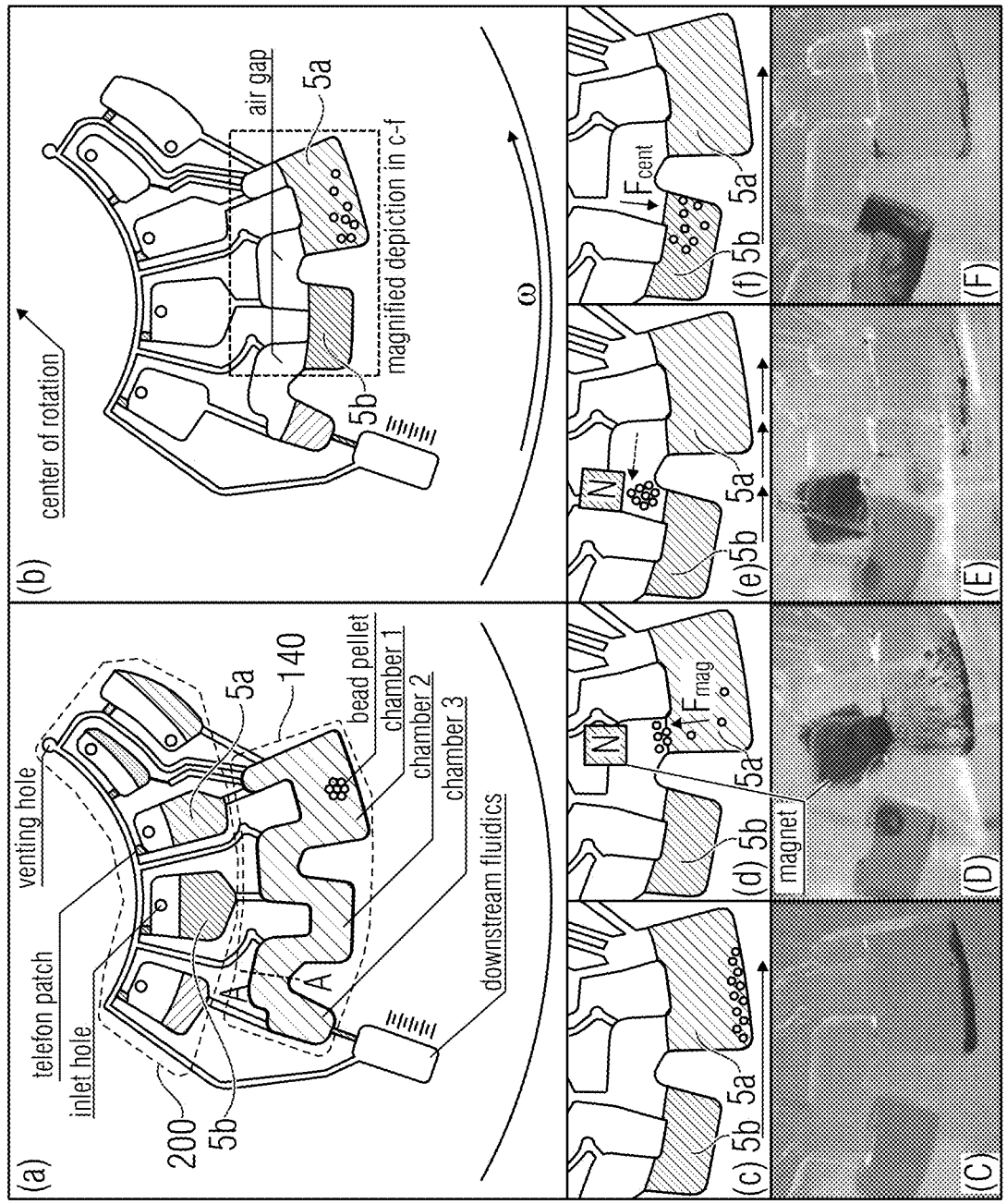
FIG. 8 is a schematic illustration of a GTM method that can be performed by an apparatus according to an embodiment of the present invention.

FIG. 8 shows a GTM method, wherein (a) shows an overview of a microfluidic structure on a LabDisk. It is the target of the process illustrated in FIG. 8 to transport a "bead pellet" (in this case the magnetic particles) successively through the fluid chambers "chamber 1"-"chamber 3". FIG. 8b shows a situation prior to a particle transport and FIG. 8c shows a schematic and FIG. 8C an experimental detailed view of the magnetic particles in the LabDisk while the cartridge is rotating. FIG. 8d shows a schematic and FIG. 8D an experimental detailed view of the transport of the magnetic particles across a liquid-gas phase boundary into an "air gap". FIG. 8e shows a schematic and FIG. 8E an experimental illustration of the particles transport through the "air gap". FIG. 8f shows a schematic and FIG. 8F an experimental illustration of the final centrifugation step where the magnetic particles are propelled into a second liquid 5b. FIG. 8 is taken from [2].

Thus, FIG. 8 illustrates the cartridge as well as the transport of the magnetic particles from one liquid into another across a phase boundary. Here, the particle transport was shown by way of nucleic acid extraction. Here, the step-by-step transport of the particles from liquid 5a to liquid 5b can be divided into three phases.

1. The particles are in "chamber 1" and are suspended in the first liquid 5a (FIGS. 8, c and C). The LabDisk rotates at a rotational speed such that the centrifugal force presses the particles to the radially outer edge of "chamber 1".
2. Gas phase transfer magnetophoresis: The LabDisk does not rotate in this step. The same is arranged with respect to the permanent magnet such that a sufficiently high magnetic force acts to transport the particles against acting restoring forces (restoring forces are, for example, a) in the liquid: Drag force by the fluid, centrifugal force (as long as the disc rotates), gravity as well as frictional forces of the particles at the cartridge wall, b) during transfer through the phase boundary the capillary force as well as the above stated frictional forces and c) frictional forces at the cartridge wall as well as capillary forces of the liquid residues surrounding the particles at the cartridge wall) (FIGS. 8, d and D). Here, the liquid in the chambers is in an uncontrolled state.

3. Particle transport in the areas of the "air gap" above "chamber 2". The disc is moved step-by-step below the magnet. Thus, the particles follow the magnet due to the magnetic force emanated by the same. In that case, merely the frictional force at the cartridge wall has a restoring effect on the particles, as well as the capillary forces of liquid transported together with the particles (FIGS. 8e and E). Here, the liquid 5a, 5b in the chambers is continuously in an uncontrolled state with respect to its location and the formation of the interface between liquid and gas.

4. Centrifuging the particles into the second liquid 5b. By fast acceleration to a high rotational frequency, such a high centrifugal force acts on the particle that the magnetic force is exceeded and hence the particles are moved radially outwards.

Depending on a width of the microfluidic connection where the GTM is performed, the centrifugal acceleration during the needed deceleration process, the materials of the cartridge and the lid of the cartridge as well as the wetting characteristics of the liquid on the contact areas of the sealing foil and the cartridge, the position of the meniscus of the liquid cannot be predicted in practice. As the magnetic force, however, decreases with the second power of the distance of a magnetizable particle from a magnet, the actual magnetic force on the particle varies heavily at the meniscus position in practice, as the meniscus position varies heavily as mentioned above.

The method is not universally applicable (i.e., for liquids having any wetting characteristics). Highly wetting liquids (e.g., alcohols or surfactants used frequently in nucleic acid extraction) can creep along the edges of the microfluidic network during phases of standstill (Concus-Finn condition). Consequently, undesired mixing of different liquids can result, which can affect the quality of the analysis to be performed.

According to an embodiment of the present invention, the LabDisk illustrated in FIG. 8 can be optimized by replacing the fluidic structures 140 by the fluidic structures 140 illustrated in FIG. 4. Thereby, the LabDisk can continuously rotate, a defined phase boundary is reached and hence mixing of the first liquid 5a and the second liquid 5b is prevented and by introducing the oblique chamber wall, the transport of the bead pellets or the magnetic particles from one chamber into the next fluid chamber is configured very efficiently.

As illustrated in FIG. 8, the fluidic structure 140 of FIG. 4 can comprise corresponding inputs to reservoirs 200.

Figure 9:
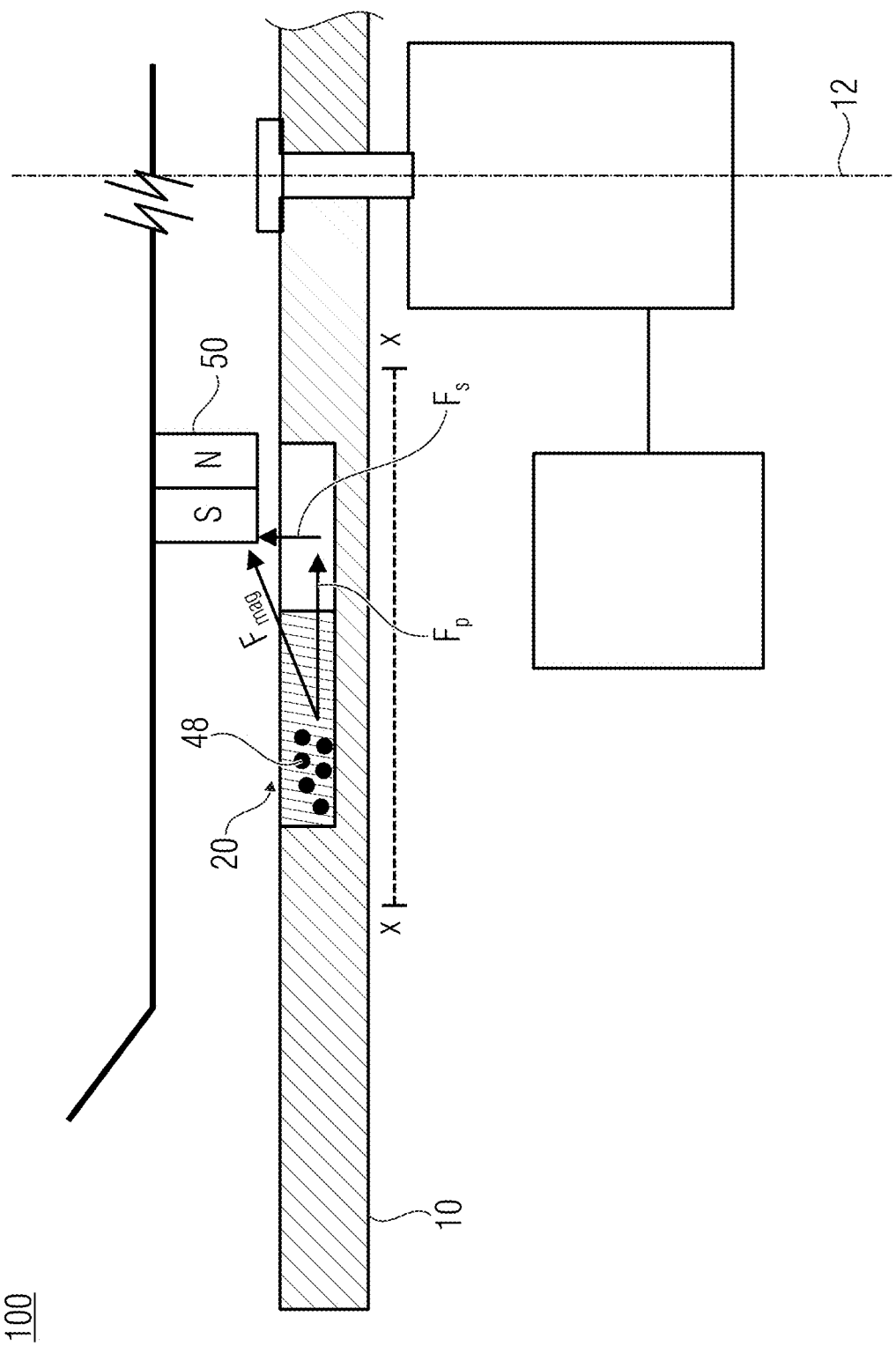
FIG. 9 is a schematic illustration of an apparatus without oblique chamber wall.

FIG. 9 shows a schematic sectional view of a centrifugal microfluidic test carrier 100, cut in radial direction, taken from reference [1]. A permanent magnet 50 can apply a magnetic force $F_{mag}$ to magnetic particles 48. By the geometry of the wall of the microfluidic chamber 20 facing the magnet 50, only the component $F_p$ pointing in the radial direction can be used for transporting the magnetic particles 48 through the liquid-gas boundary according to current technology.

Hence, merely a fraction of the theoretically usable magnetic force $F_{mag}$ is used since the main component of the magnetic force vector $F_{mag}$ acts in the described configuration orthogonally to the wall of the cartridge 10 ($F_s$) and not in the direction of transport of the magnetic particles 48 (in direction $F_p$). This has the effect that long times of standstill of the cartridge 10 are needed since the magnetic force $F_p$ effectively used for transferring the magnetic particles 48 is low. Additionally, the magnetic field component $F_s$ acting perpendicularly has the effect that the transport of the magnetic particles towards the center of rotation 12 depends heavily on the surface condition of the chamber wall facing the magnet 50 and can even be completely suppressed from a critical surface roughness onward (it has to be noted that FIG. 9 is misleading since the graphical size of the vectors does not correspond to the actual size of the forces (i. a. $F_s > F_p$ applies)).

According to an embodiment of the present invention, an apparatus can comprise the fluid chamber geometry in the fluidic structures shown in FIG. 9 and the same can further comprise a geometry of a connection between the fluid chambers as described, e.g., in FIG. 4, FIG. 5A, FIG. 5B or FIG. 5C, whereby the transport of the magnetic particles 48 from one fluid chamber into another fluid chamber via the inventive connection is optimized such that the magnetic particles 48 can be transported more efficiently from one fluid chamber into the other fluid chamber since a higher portion of the magnetic force acts on the magnetic particles due to the specific geometry in the direction of transport. Further, return transport from the other fluid chamber into the first fluid chamber, for example, can be prevented by a backward-directed step and the geometry allows prevention of mixing of liquids in the different fluid chambers by the specific geometry of the connection.

Figure 10A:
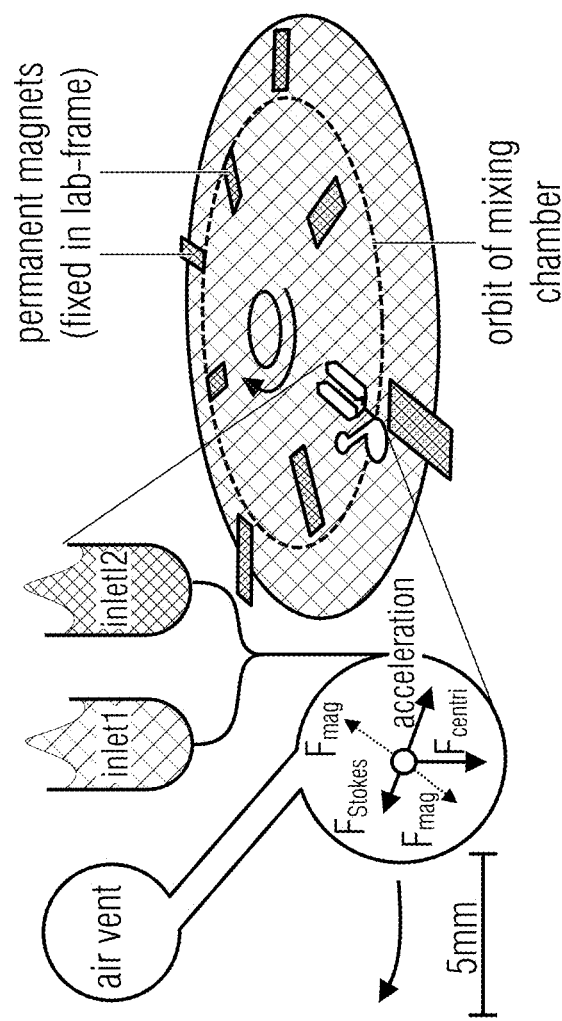
FIG. 10A is a schematic illustration of a centrifugal microfluidic cartridge.
Figure 10B:
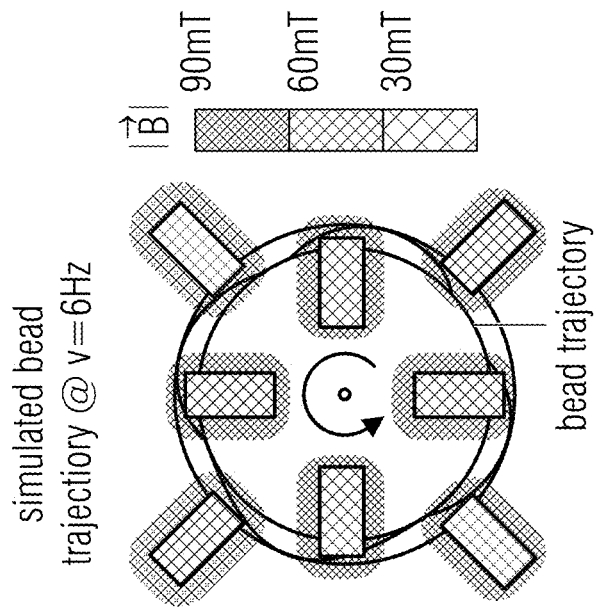
FIG. 10B is a schematic illustration of a magnetic force element geometry that can be used for an apparatus according to an embodiment of the present invention.

FIG. 10A shows a schematic view of a centrifugal microfluidic cartridge wherein, on the left, an examined geometry is illustrated in an enlarged manner. Water and ink, for example, are input in "inlet 1" and "inlet 2". In the mixing chamber, the same are mixed by accelerating an decelerating the cartridge (resulting in $F_{Stokes}$, $F_{Cent}$) as well as by deflecting magnetic particles due to external magnets ($F_{mag}$). FIG. 10B is a schematic illustration of an arrangement of the external magnets with a simulation of a trajectory of the magnetic particles in the centrifugal microfluidic cartridge according to FIG. 10A. FIG. 10A and FIG. 10B are taken from [3].

Here, for example, permanent magnets are arranged above or below the centrifugal microfluidic cartridge (see FIG. 10A) such that, by rotation, the magnetic particles in the cartridge pass through the magnetic field of the permanent magnets of the same with every rotation. By positioning the permanent magnets radially outside or radially inside the orbit of the mixing chamber (see FIG. 10A), a trajectory of the magnetic particles (see FIG. 10B) can be obtained, which results in transport of the magnetic particles through the chamber. The convection generated in that way results in mixing of the liquids at a rotational frequency of 6 Hz (here ink and water, total volume 25 µL).

According to an embodiment of the present invention, an apparatus can comprise a magnetic force element arrangement according to FIG. 10B with a distributed arrangement of, e. g. eight magnetic force elements or also with a magnetic force element geometry deviating from the geometry illustrated in FIG. 10B, such that the apparatus of the present invention can be configured to transport magnetic particles in the fluidic structures (that can consist, e.g., of a single fluid chamber according to the fluid chamber 170 or 172 of FIG. 1, FIG. 2, FIGS. 3a to 3c, FIG. 4, FIGS. 5a to 5c or FIGS. 6A-6C, e.g. with an input to "inlet 1" and "inlet 2") such that liquids in the fluidic structures of the apparatus can be mixed efficiently and homogeneously.

If the invented apparatus comprises at least two magnetic force elements, the magnetic force elements can be configured to apply a common magnetic force to the magnetic particles disposed in the fluidic structures of the apparatus.

Figure 11B:
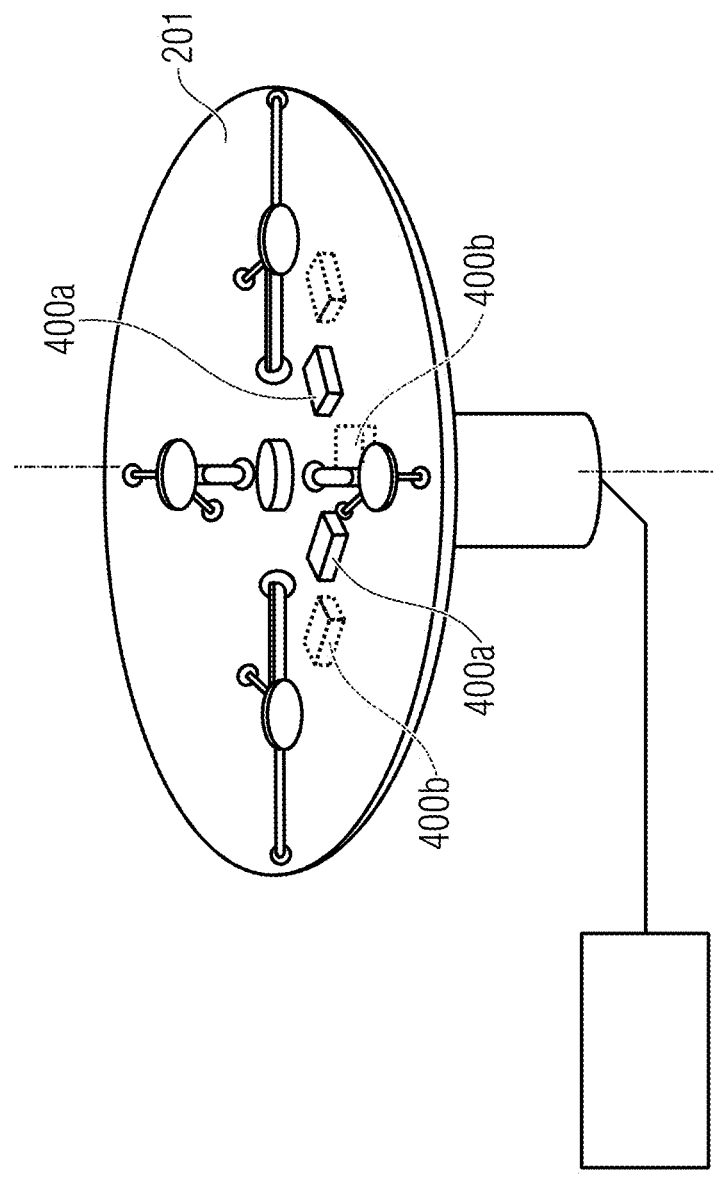
FIG. 11B is a schematic illustration of a centrifugal microfluidic cartridge according to current technology.
Figure 11A:
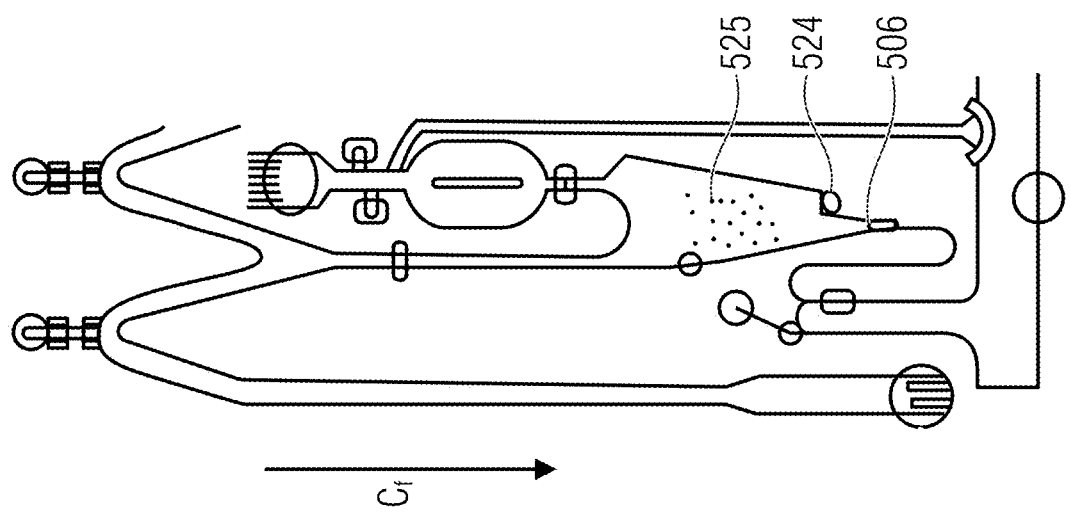
FIG. 11A is a schematic illustration of a microfluidic structure according to current technology.

FIG. 11A shows from [4] a microfluidic structure and FIG. 11B shows a view (taken from [4]) of a centrifugal microfluidic cartridge 201. The microfluidic structure illustrated in FIG. 11A can use magnetic particles 525 not only for mixing but can also store the magnetic particles by a respective arrangement in "pocket 1" 506 or "pocket 2" 524. FIG. 11B shows a possible arrangement of the permanent magnets both above the cartridge 400a as well as below the cartridge 400b or on both sides. The magnets do not rotate but are, e. g., stationary.

Andersson et al. [4] describes a microfluidic structure using magnetic particles for mixing (cf. FIG. 11A and FIG. 11B). Contrary to Grumann et al. [3], the option of arranging magnets on both sides of the cartridge (see FIG. 11B) is described. This is advantageous when mixing deep chambers, since the magnetic particles cannot only be moved radially and azimuthally but also in vertical direction. Further, a process has been described wherein the particles can be "sedimented" into a pocket or a different pocket by selecting the rotational frequency and its sign (in the clockwise direction or opposite to the clockwise direction). As a restriction, it has to be mentioned that in [4] merely processes manipulating particles within a reaction chamber are described, i. e. no transfer of the particles from one chamber to another chamber.

According to an embodiment of the present invention, the magnetic force element of the apparatus can comprise the magnetic force element arrangement illustrated in FIG. 11B to transport magnetic particles in the fluidic structures (that can consist, e.g., of a single fluid chamber according to the fluid chamber 170 or 172 of FIG. 1, FIG. 2, FIGS. 3a to 3c, FIG. 4, FIGS. 5a to 5c or FIGS. 6A-6C) such that, e.g., liquids in the fluidic structures can be mixed by the apparatus. Here, it can be advantageous that the apparatus comprises magnetic force elements both on the side of the substrate facing the oblique chamber wall as well as on the opposite substrate side, wherein the magnetic force elements are arranged in a stationary manner, e. g. on a first and a second external carrier (e. g. arranged on the two opposite sides of the substrate). Here, the arrangement of the magnetic force elements can also deviate from the variation shown in FIG. 11B.

Figure 12:
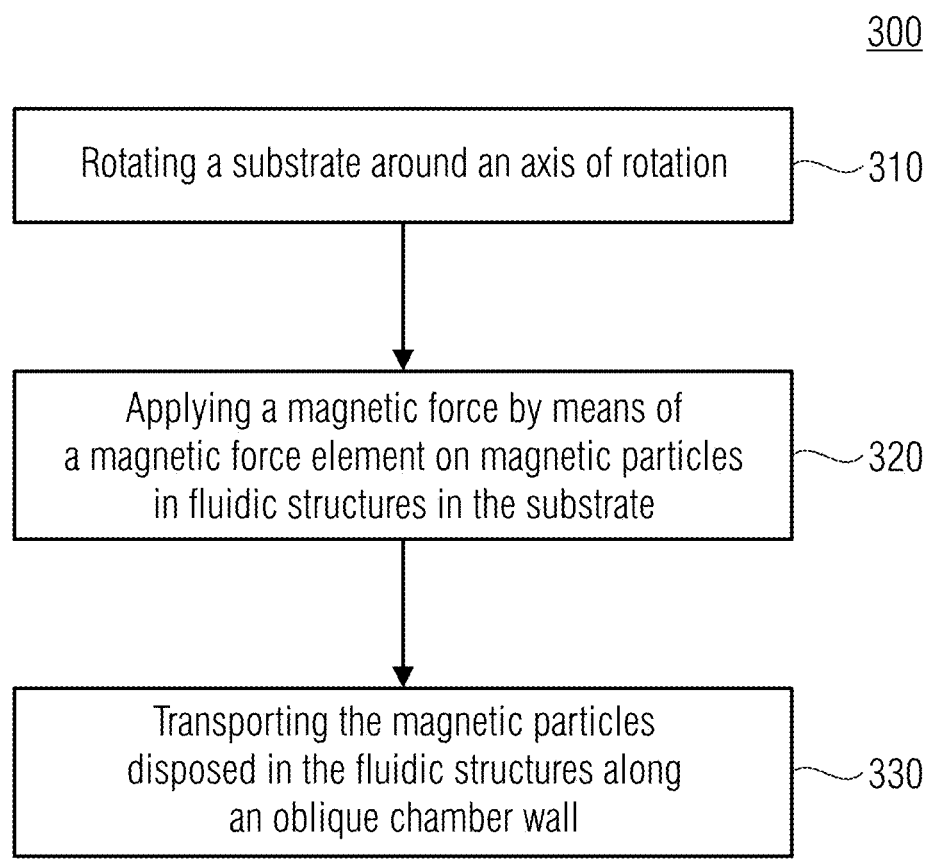
FIG. 12 is a block diagram of a method for transporting magnetic particles according to an embodiment of the present invention.

FIG. 12 shows a block diagram of a method 300 for transporting magnetic particles. The method can comprise the step of rotating 310 a substrate around an axis of rotation by means of a drive, wherein a positional relationship between a magnetic force element and fluidic structures in the substrate can be continuously changed. Further, by means of the magnetic force element, a magnetic force can be applied to the magnetic particles disposed in the fluidic structures 320, depending on the positional relationship between the magnetic force element and the fluidic structures in the substrate. The fluidic structures in the substrate can comprise an oblique chamber wall arranged at an angle α with respect to a plane perpendicular to the axis of rotation, and the oblique chamber wall can be inclined towards the magnetic force element, wherein the magnetic force element is arranged radially inside the oblique chamber wall with respect to the axis of rotation. Further, the method 300 can comprise transporting 330 the magnetic particles disposed in the fluidic structures along the oblique chamber wall radially inwards with respect to the axis of rotation by means of a force applied to the magnetic particles during a 360° rotation.

According to an embodiment, a rotational frequency can be varied during rotating 310 such that when applying 320 the magnetic force in a first phase, the rotational frequency exceeds a critical rotational frequency, whereby the magnetic particles are transported by the magnetic force along the oblique chamber wall in the direction radially inwards with respect to the axis of rotation out of a first fluid chamber 330 and transported parallel to an inner wall of a connection to a turning point of the connection between the first fluid chamber and a second fluid chamber, and in a second phase the rotational frequency exceeds the critical rotational frequency, whereby the magnetic particles are transported centrifugally in a direction radially outwards with respect to the axis of rotation from the connection into the second fluid chamber.

According to an embodiment, at least one of the two fluid chambers can be at least partly filled with a liquid medium and, during transport 330, the magnetic particles can be moved across a phase boundary between the liquid medium and a gaseous medium along the oblique chamber wall. The oblique chamber wall eases transporting and hence optimizes the method 300.

According to an embodiment, the magnetic particles can be transported to a fluid chamber without liquid medium by the method 300 and can be dried in the fluid chamber without liquid medium.

According to an embodiment, both fluid chambers can be partly filled with liquid medium, such that, during transport 330, the magnetic particles are transported from a first liquid medium via a gaseous medium into a second liquid medium.

According to an embodiment, the magnetic particles can be dried in the gaseous medium during transport. This allows prevention of mixing of the first liquid medium with the second liquid medium.

According to an embodiment, the first fluid chamber can be filled with the liquid medium such that the phase boundary between the first liquid medium and the gaseous medium is arranged on the oblique chamber wall. This allows a simplified transport 330 of the magnetic particles through the phase boundary since a magnetic force component points into the direction of transport.

According to an embodiment, the second fluid chamber can be partly filled with liquid medium and the first fluid chamber can be completely filled with gaseous medium. Further, the first fluid chamber can comprise the magnetic particles such that, during transport 330, the magnetic particles can be transported from the first fluid chamber via the gaseous medium into the second fluid chamber filled with the liquid medium.

Thus, the method 300 allows manipulation of magnetic particles in a centrifugal gravitational field.

In other words, the inventive apparatus 100 and the inventive method 300 can be described as follows:

A method/structure consisting, e. g. of a drive and a fluidic module. The fluidic module rotates, e. g. permanently (i. e. for the duration of the process) around an axis of rotation. Optionally, a number of interconnected chambers is located in the fluidic module. The chambers are filled, e. g. with liquid. The liquids in the chambers are separated optionally by a gas volume. Magnetic particles are disposed in at least one of the chambers. One or several magnets are arranged opposite to the fluidic module, e. g. such that the magnetic field passes through the chamber during the process and the position of the magnetic field represents a function of the rotational speed with respect to the chambers. Here, the magnetic field applies a magnetic force to the magnetic particles. During rotation above a critical rotational frequency, the particles remain, e. g. in the chamber, below a critical rotational frequency, the particles are transported, due to the magnetic force, e. g. radially inwards out of the liquid into the gas volume, wherein the connecting structures between the chambers filled with gas are arranged such that the particles can be transported from one of the chambers into a further chamber during continuous rotation.

Method according to an embodiment, wherein a wall (e. g. an oblique chamber wall) is arranged in one or several chambers at the location of the liquid-gas interface such that the same has an angle with respect to an r-phi plane, whereby an acting frictional force and an acting magnetic force can be adjusted as a function of the angle.

Method according to an embodiment, wherein the particles reach a guiding structure on their path radially inwards (e. g. an inner wall of a connection between a first fluid chamber and a second fluid chamber), which comprises a radial gradient and is hence configured such that the particle movement (along the oblique chamber wall) is guided in the direction of the next chamber (e. g. the second fluid chamber).

Method according to an embodiment, wherein particles reach a pocket (e. g. the second fluid chamber) where no liquid resides and the same can be dried.

Method according to an embodiment, wherein a forward-directed step is arranged in the connecting channel of the chambers opposite to the direction of transport of the particles, which prevents movement of the particles opposite to the process direction.

Method according to an embodiment, wherein the direction of rotation is changed to invert the direction of the particle transport.

Method according to an embodiment, wherein the magnetic force on the particles can be adjusted for each location of the chamber as a function of the chamber depth.

Method according to an embodiment, wherein the azimuthal extension is the only variable quantity with respect to the dimensions of a chamber, wherein a constant radial position of the liquid gas interface is given for each liquid volume.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] O. Strohmeier, F. von Stetten, D. Mark, Method of transporting magnetic particles, EP20110767960 (2011).
[2] O. Strohmeier, A. Emperle, G. Roth, D. Mark, R. Zengerle, F. von Stetten, Centrifugal gas-phase transition magnetophoresis (GTM)-a generic method for automation of magnetic bead based assays on the centrifugal microfluidic platform and application to DNA purification, Lab on a chip 13 (2013) 146-155.
[3] M. Grumann, A. Geipel, L. Riegger, R. Zengerle, J. Ducree, Batch-mode mixing on centrifugal microfluidic platforms, Lab on a chip 5 (2005) 560-565.
[4] G. J. Per Andersson, Enhanced Magnetic Particle Steering, US2008/0073546 A1 (2007), Gyros Patent AB.

The invention claimed is:
1. An apparatus for transporting magnetic particles, comprising:
a substrate configured for rotation around an axis of rotation;
fluidic structures in the substrate, wherein the fluidic structures comprise a first fluid chamber, a second fluid chamber and a connection connecting the first fluid chamber to the second fluid chamber;
a magnetic force element configured to apply a magnetic force to the magnetic particles disposed in the fluidic structures, depending on a positional relationship between the magnetic force element and the fluidic structures; and
a drive configured to provide the substrate with a rotation around the axis of rotation, whereby the positional relationship between the magnetic force element and the fluidic structures changes continuously, and to apply a force to the magnetic particles during a rotation at an angle of 360° around the axis of rotation to transport the magnetic particles via the connection from the first fluid chamber into the second fluid chamber;
wherein the connection comprises an inner wall comprising a lower radial position than an outer wall with respect to the axis of rotation and the lower radial position changes in azimuthal direction towards the second fluid chamber to change a position of the magnetic particles during transport through the connection both in azimuthal direction from the first fluid chamber in a direction of the second fluid chamber as well as in a direction radially inwards with respect to the axis of rotation when the substrate is provided with a rotational frequency lower than a critical rotational frequency;
wherein the lower radial position of the inner wall changes in azimuthal direction radially inwards up to a turning point and the lower radial position changes radially outwards from the turning point, wherein the inner wall is configured to stop the magnetic particles at this turning point due to the magnetic force when the substrate is provided with the rotational frequency lower than the critical rotational frequency; and
wherein the inner wall is configured after the turning point such that, when providing the substrate with a rotational frequency greater than the critical rotational frequency, the position of the magnetic particles is equally changed both in azimuthal direction, in the direction of the second fluid chamber, as well as in a direction radially outwards with respect to the axis of rotation to transport the magnetic particles into the second fluid chamber.

2. The apparatus for transporting magnetic particles according to claim 1, wherein the connection leads into the second fluid chamber such that a step is formed at an orifice, which prevents transport of the magnetic particles from the second fluid chamber into the connection when a magnetic force acts.

* * * * *